US010506031B1

(12) United States Patent
Cheng et al.

(10) Patent No.: US 10,506,031 B1
(45) Date of Patent: Dec. 10, 2019

(54) SCALABLE NETWORK FOR PROCESSING VIRTUAL ENVIRONMENTS

(71) Applicant: Amazon Technologies, Inc., Seattle, WA (US)

(72) Inventors: Pablo Puo Hen Cheng, Pomona, CA (US); Jesse Aaron Van Beurden, Irvine, CA (US); Rosen Ognyanov Baklov, Lake Forest, CA (US); Igor Gorelik, Irvine, CA (US)

(73) Assignee: Amazon Technologies, Inc., Seattle, WA (US)

( * ) Notice: Subject to any disclaimer, the term of this patent is extended or adjusted under 35 U.S.C. 154(b) by 721 days.

(21) Appl. No.: 14/859,056

(22) Filed: Sep. 18, 2015

(51) Int. Cl.
*G06F 15/16* (2006.01)
*H04L 29/08* (2006.01)
*H04L 12/26* (2006.01)
*H04L 29/06* (2006.01)

(52) U.S. Cl.
CPC .......... *H04L 67/1031* (2013.01); *H04L 43/16* (2013.01); *H04L 67/42* (2013.01)

(58) Field of Classification Search
CPC . H04L 67/02; H04L 67/2842; H04L 67/1097; H04L 67/10; H04L 67/42; H04L 67/1023; H04L 67/1095; H04L 47/125; G06F 17/30554; G06F 17/30324; G06F 3/067; G06F 17/3053; G06F 17/30575; G06F 17/30899; G06F 19/328; G06F 21/6218; G06Q 40/02
See application file for complete search history.

(56) References Cited

U.S. PATENT DOCUMENTS

| 8,271,651 | B1 | 9/2012 | Wang et al. |
|---|---|---|---|
| 9,229,657 | B1 | 1/2016 | Rus et al. |
| 9,501,915 | B1 | 11/2016 | Laska et al. |
| 2002/0095403 | A1 | 7/2002 | Chandrasekaren et al. |
| 2002/0095454 | A1 | 7/2002 | Reed et al. |
| 2003/0115434 | A1 | 6/2003 | Mahalingam et al. |
| 2003/0177187 | A1 | 9/2003 | Levine et al. |
| 2004/0103182 | A1 | 5/2004 | Krabel et al. |
| 2004/0117345 | A1 | 6/2004 | Bamford et al. |
| 2004/0117377 | A1 | 6/2004 | Moser et al. |
| 2005/0060275 | A1* | 3/2005 | Steuernagel ...... G06F 17/30371 |

(Continued)

*Primary Examiner* — Michael A Keller
*Assistant Examiner* — Thao D Duong
(74) *Attorney, Agent, or Firm* — BakerHostetler

(57) ABSTRACT

A dynamically scalable computing framework used in support of on-line services is disclosed. A network is formed from computing nodes communicatively coupled with communication hubs in a mesh configuration. A load balancing module executing on a computing node monitors processing relating to a plurality of data objects. When a processing threshold is reached, the computing node dynamically reallocates processing of a subset of data objects sharing the same property to a second computing node. Processing nodes in the network receive subscription rules defining characteristics of data objects suitable for copying to another computing node in the network. In response to receiving subscription rules, processing nodes evaluate the rules against data objects on the particular processing node to identifying data objects that should be copied to the other processing nodes corresponding to the received subscription rules.

18 Claims, 15 Drawing Sheets

(56) References Cited

U.S. PATENT DOCUMENTS

| | | |
|---|---|---|
| 2005/0278731 A1* | 12/2005 | Cameron ............... H04H 60/66 725/14 |
| 2006/0069702 A1 | 3/2006 | Moeller et al. |
| 2006/0149516 A1 | 7/2006 | Bond et al. |
| 2006/0265554 A1 | 11/2006 | Carter et al. |
| 2007/0097959 A1 | 5/2007 | Taylor |
| 2007/0149216 A1* | 6/2007 | Misikangas ........... H04W 64/00 455/456.1 |
| 2008/0033812 A1 | 2/2008 | McKenna et al. |
| 2008/0168390 A1 | 7/2008 | Benyamin |
| 2009/0254601 A1 | 10/2009 | Moeller et al. |
| 2010/0235409 A1* | 9/2010 | Roy ................. G06F 17/30094 707/812 |
| 2011/0055210 A1* | 3/2011 | Meredith .......... G06F 17/30601 707/737 |
| 2011/0126131 A1 | 5/2011 | Baszucki |
| 2011/0161451 A1 | 6/2011 | Hum et al. |
| 2011/0191628 A1 | 8/2011 | Noguchi et al. |
| 2013/0044106 A1* | 2/2013 | Shuster .................. G06T 19/20 345/419 |
| 2013/0121263 A1 | 5/2013 | Nguyen et al. |
| 2013/0283146 A1 | 10/2013 | Barak et al. |
| 2013/0346572 A1 | 12/2013 | Jain et al. |
| 2014/0228115 A1 | 8/2014 | Kaplan |
| 2014/0359230 A1 | 12/2014 | Arora et al. |
| 2015/0382059 A1 | 12/2015 | Mano |

\* cited by examiner

SCALABLE NETWORK FOR PROCESSING VIRTUAL ENVIRONMENTS

BACKGROUND

The number of applications and services that are accessible via public computing networks has expanded greatly in recent years. E-mail, banking, and data storage are just a few examples of services that users regularly access via the Internet and which are referred to as being "on-line" or "in the cloud." Even video game which once had been exclusively a desktop application is now provided by services in the cloud.

The on-line services enjoyed by so many are supported by sophisticated networks and high speed computing centers. As the demand for on-line services continues to grow, the providers of such services are under constant pressure to improve their networks and computing resources.

BRIEF DESCRIPTION OF DRAWINGS

The following description of the illustrative embodiments may be better understood when read in conjunction with the appended drawings. It is understood that potential embodiments of the disclosed systems and methods are not limited to those depicted.

DETAILED DESCRIPTION

Figure 1A:
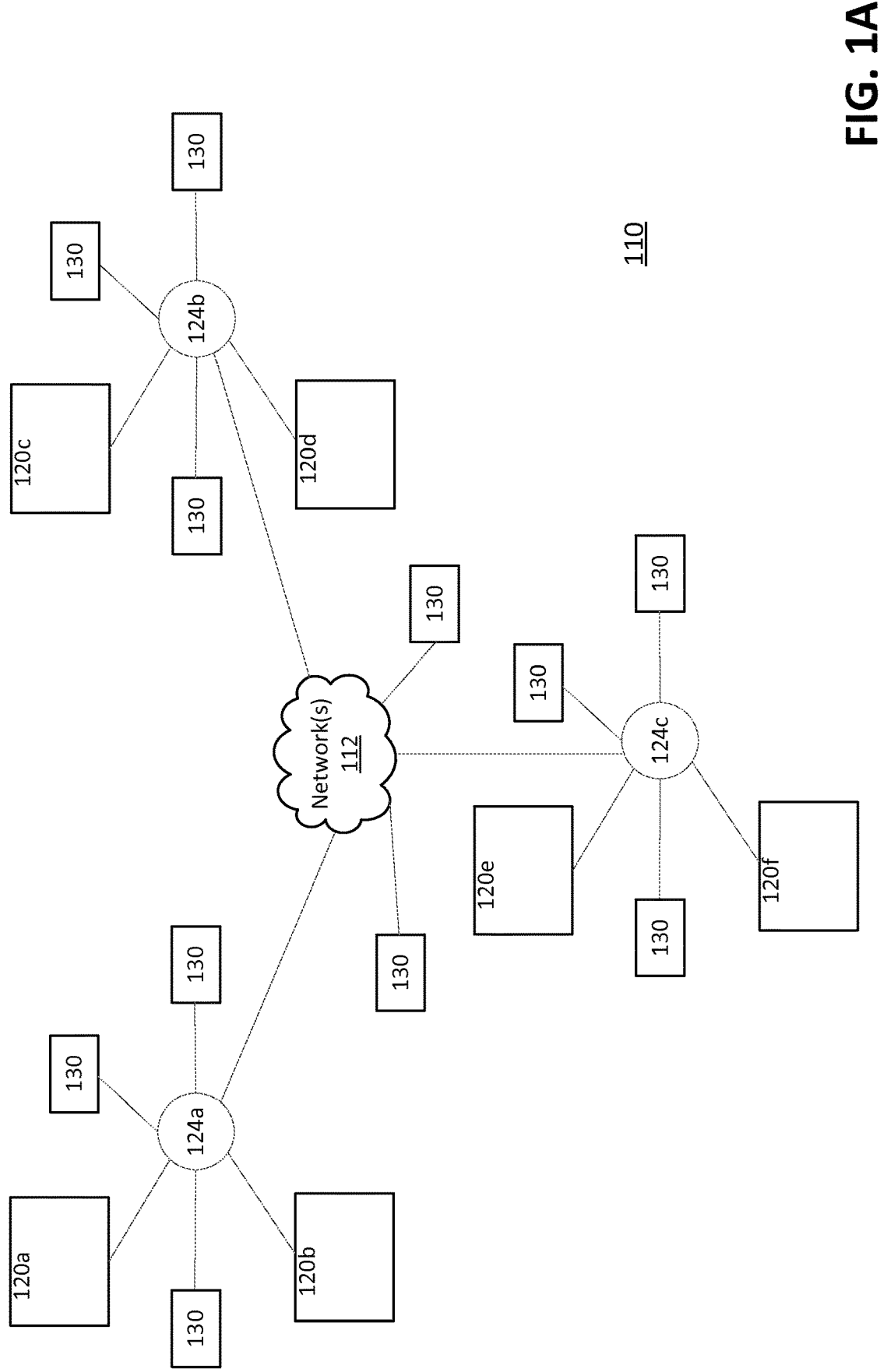
FIG. 1A depicts an example computing network.

Providers of on-line or cloud based services have sought to provide increasingly complex applications and services to an ever-growing group of on-line users. This is true, for example, in connection with on-line gaming. On-line games vary widely in the type of activities provided and the computational infrastructure required to provide such games as an on-line service. Some on-line games such as, for example, card games and role playing games, are relatively slow paced, involve relatively limited amounts of data traffic, and are relatively computationally simple. On-line service providers are typically able to support many simultaneous users of such games due to the limited computing resources required.

By contrast, some on-line games are relatively fast paced, computationally complex, and involve transmitting large amounts of data. For example, action games such as war games are typically fast paced and involve the simulation of a complex three dimensional worlds with thousands of objects that must be simulated and rendered. Such complex scenarios are often implemented in a multi-node computing environment in order to distribute computational tasks amongst computing nodes and thereby provide more efficient and responsive processing. Distribution of computational tasks in a multi-node computing environment may change over time as simulation tasks evolve and change. Frequently, processing of tasks can become inefficient as loads become unbalanced and particular nodes become over-burdened. In order to avoid a less than optimal user experience, computationally complex games are often limited in the number of simultaneous users.

Applicants disclose herein a computing framework that is dynamically scalable so as to support on-line applications that are computationally intensive and operate on large amounts of distributed data items.

According to an aspect of the disclosed embodiments, on-line services are provided using a network that is adaptable to the changing computing load experienced by the network. In an example embodiment, a network comprises a fully-connected mesh of computing servers and hubs. Each computing server, which may be programmed, for example, to simulate three dimensional activities in support of on-line games, is communicatively coupled with a communication hub. The communication hubs are communicatively coupled with each other and provide a pathway by which computing servers may communicate with each other. User systems, which may be, for example, personal computing devices, are communicatively coupled to the hubs in a hub-and-spoke arrangement. Data is communicated between the user systems and the computing servers via the hubs. The hubs buffer data between the computing servers and user systems which allows computing servers to be easily added and removed from the network without interfering with connections made by particular user systems. Moreover, user systems may be switched between hubs so as to be connected to a hub that is already receiving information of particular interest from a computing server.

According to another aspect of the disclosed embodiments, processing of data objects may be dynamically reassigned to a new set of computing servers in order to alleviate processing load on an existing server. In an example scenario, computing nodes in a network of nodes may perform simulation processing in connection with a gaming service, which may be referred to as a content item, and may operate on data objects that correspond to players and objects in a game sequence. A load balancing module executing on the nodes in the network monitors performance relating to the processing of the plurality of data objects. When a threshold relating to processing by the nodes is reached, the nodes dynamically determine how to reallocate processing of the data objects amongst the computing nodes in the network. In an example scenario, where a computing node reaches 90 percent of processing capacity, the particular node may begin processing to determine how to reallocate data objects that are currently being processed by the particular node. In an example embodiment, the computing nodes evaluate the existing groups of data objects to determine if the data objects could be clustered differently than they are currently for purposes of processing. In an example scenario, a module operating on the computing nodes may determine that an existing grouping of data objects that is being processed by a single node should be divided into two or more groups. The module identifies a second computing node and transfers control of a portion of the data objects to the second computing node. In an example scenario, a computing node may be devoted to simulating a subset of data objects in a game world. In such an embodiment the computing node may distribute simulation load among a plurality of simulation nodes, adding or removing simulation nodes as needed based on declared performance metrics, and using information such as object proximity, interaction dependencies and other heuristics to determine how to split the load.

According to another aspect of the disclosed embodiments, data objects may be dynamically distributed based upon characteristics defining the types of objects that are of interest to particular computing nodes and the attributes of the data objects themselves. In an example embodiment, each of a plurality of computing nodes has stored thereon a set of rules, which may be referred to as subscription rules, defining characteristics of data objects that are suitable for distribution to the particular computing node. For example, a first computing node may have stored thereon a first set of rules defining characteristics of data objects that the first computing node may use during its processing. A second computing node may have stored thereon a second set of rules defining characteristics of data objects that the second computing node may use during its processing. In an example embodiment, each computing node in the network communicates the set of subscription rules stored thereon to the computing nodes that are communicatively coupled to the particular computing node. In an example scenario wherein three nodes are communicatively coupled, each communication node communicates its rules to the two nodes to which the node is attached.

Upon receipt of the subscription rules from the connected computing nodes, each computing node evaluates or compares the subscription rules to the attributes of data objects stored on the particular node. Where the computing node determines a particular subscription rule corresponds to the attributes of a data object, the computing node marks the particular data object for copying to the computing node to which the particular subscription rule applies. In an example scenario, where a first computing node determines a subscription rule corresponding to a second computing node matches the attributes of a particular data object stored on the first node, the data object is marked for, and eventually copied to, the second computing node. The dynamic distribution of data objects based upon matching of subscription rules to data object attributes allows for data objects to be copied to only those computing nodes that actually have a need for the data object, rather than distributing data objects to all nodes. The copying or replication of data objects in the network is dynamic in that as new subscription rules corresponding to additional nodes are received, data objects may be copied or replicated to the nodes corresponding to the new subscription rules.

Example Network Configuration

According to one aspect of the disclosed embodiments, system components are configured and interconnected so as to provide for flexible and scalable use of system resources. FIG. 1A is a diagram illustrating an example computing network 110. It will be appreciated that computing network 110 may be employed in support of providing any suitable on-line service of functionality. For example, network 110 may be adapted to provide processing for on-line gaming. In such a scenario, requests from client devices may be processed by nodes on network 110 in order to provide simulation in support of an on-line game.

As shown in FIG. 1A, a plurality of computing systems 120*a-f* are communicatively coupled in any suitable manner, for example using a hub communication systems 124*a-c*.

Figure 1B:
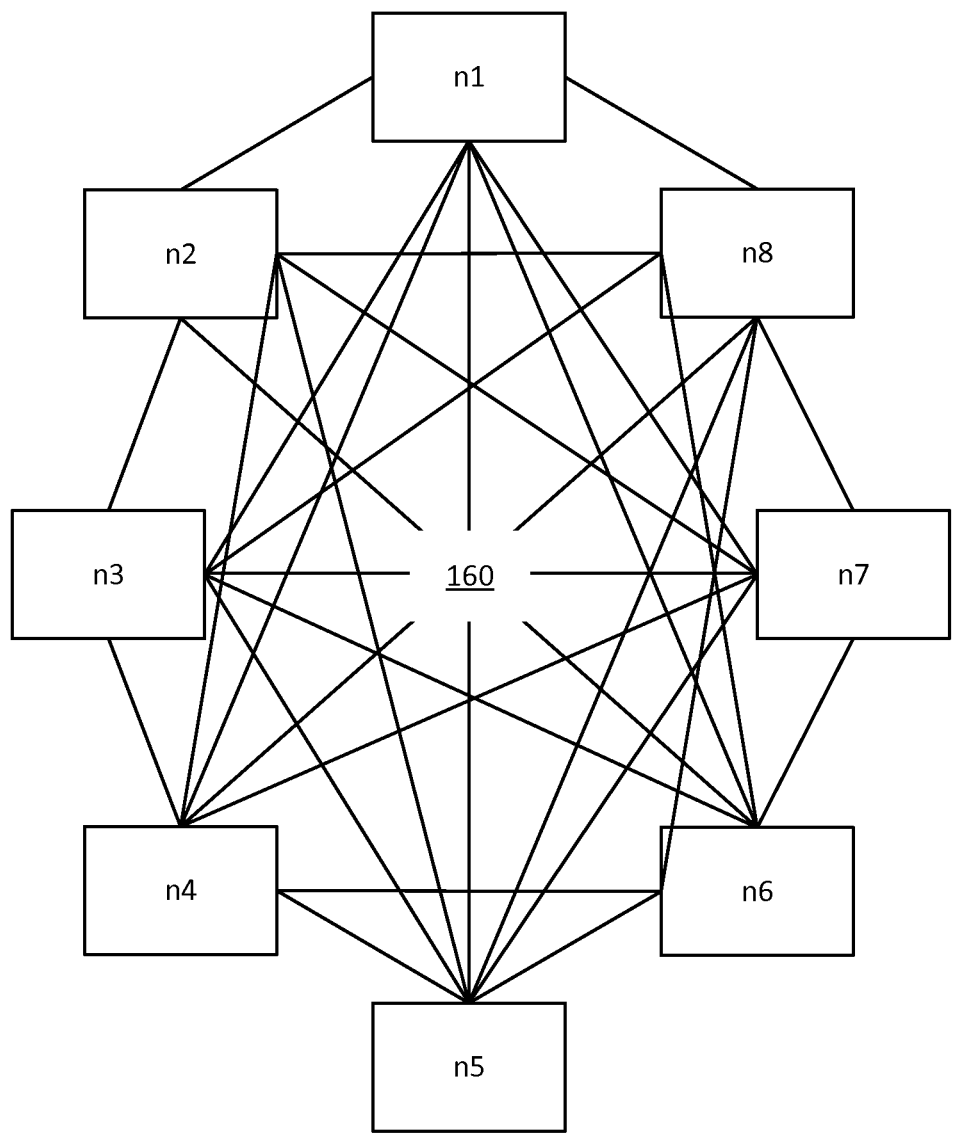
FIG. 1B depicts an example computing network.

Other communication systems or architectures can be used, for example, as shown in FIG. 1B. Computing systems 120*a-f* may be programmed to provide processing relating to an on-line or cloud service. In an example embodiment, computing systems 120*a-f* may be programmed to operate as simulation servers as part of an on-line gaming service. In an example scenario, computing systems 120*a-f* may be programmed to perform physics calculations and simulate physical interactions between objects. Computing systems 120*a-f* may comprise any suitable combination of hardware and software. In an example scenario, computing systems 120*a-f* may be implemented using virtual servers in a web services computing environment.

Client computing systems 130 are likewise communicatively coupled to hub communication/computing systems 124*a-c* and are programmed to access services and data provided by network 110 and, in particular, by computing systems 120*a-f*. In an example embodiment wherein computing systems 120*a-f* are programmed to operate as simulation servers as part of an on-line gaming service, client computing systems 130 may be programmed to access data objects and processing provided by computing systems 120*a-f*. More particularly, client computing systems 130 may be used to play on-line games, the processing for which is provided by computing systems 120*a-f*. Client computing systems 130 may comprise any combination of hardware and software suitable to enable interfacing with computing systems 120*a-f* via hubs 124*a-c*. For example, client computing systems 130 may comprise user devices such as desktop or laptop computers, pad devices, and/or phone devices.

Client computing systems 130 may be communicatively coupled in any suitable manner to hub communication and computing systems 124*a* and computing systems 120*a-f*. In an example embodiment, client computing systems 130 may access hub communication and computing systems 124*a* and computing systems 120*a-f* via network 112, which may comprise the Internet and/or any similar network. According to another aspect of the disclosed embodiments, and as illustrated in FIG. 1A, a plurality of client computing systems 130 may be arranged with hub systems 124 in a hub-and-spoke configuration.

As shown in FIG. 1A, hub communication and computing systems 124*a-c* are communicatively coupled with computing systems 120, client systems 130, as well as with each other. Hub systems 124*a-c* are programmed to relay data between computing systems 120, between client computing systems 130 and computing systems 124*a-c*, and between hub systems 124. In an example scenario, hubs 124 are programmed to relay simulation results to client systems 130 access gaming functionality on computing systems 124. In the example embodiment, the hub systems 124*a-c* may be communicatively coupled via network 112, which may comprise any suitable networking topology including the Internet. Hub systems 124 may comprise any suitable combination of computing hardware and software to provide the functionality as described herein. It will be appreciated that hub communication and computing systems 124 may be referred to herein by any suitable term including, for example, hub, hub system, hub computing system, hub communication system, hub communication and computing system, etc. It will be appreciated that while FIG. 1A depicts each computing system 120 being communicatively coupled to one hub, one or more computing systems 120 may be communicatively coupled to multiple communication hubs 124 in any suitable arrangement. In other words, each computing system 120 may be coupled to more than one communication hub 124. Moreover, and as noted in connection with FIG. 1B, each computing system 120 may be directly connected to one or more other computing systems 120 without use of a communication hub 124.

The communicative coupling allows for computing systems 120*a-f*, which may be associated with any one of the hub systems 124*a-c*, to communicate with other of the computing systems 120*a-f* which may be connected to another hub system 124*a-c*. In an example embodiment, computing systems 120*a-f*, client computing systems 130, and hub systems 124*a-c* are programmed to operate in peer-to-peer configuration relative to each other. Accordingly, any one computing system 120*a-f*, 130, and 124*a-c* may communicate messages and data to any other of computing systems 120*a-f*, 130, 124*a-c* in network 110.

In an example embodiment, computing systems 120*a-f*, hub systems 124*a-c*, and client computing systems 130 are addressable points within network 110 and may be referred to as network nodes. According to another aspect of the disclosed embodiments, systems or nodes 120, 124, and 130 may be configured to operate as a mesh network. In such an embodiment, each system or node in the network is programmed to relay data and messages to other nodes in the network. In an example embodiment depicted in FIG. 1A, data and instructions may be routed from one node in the network, e.g., computing system 120*a*, to another node in the network, e.g., computing system 120*d*, via the intermediate network nodes, e.g., hub systems 124*a* and 124*b*. FIG. 1B illustrates another example network arrangement of nodes which are arranged in a mesh network. As shown in FIG. 1B, nodes n1 through n8 that are connected via a mesh network 160. The specific topology can vary, and the network 160 may include any number of routers and other network devices. In an embodiment such as is shown in FIG. 1B, the nodes, which may be servers, may be coupled to each other without use of communication hubs. Further, each node may have communication connections with multiple hubs so as to facilitate direct communication. The network 160 may include one or more wide area networks (WANs) such as the Internet and/or one or more local area networks (LANs). Nodes n1 through n8 may be suitable computing devices such as servers having one or more processors and memory. Together, nodes n1 through n8 may form a multi-node computing environment that may execute applications that simulate various environments, such as in a multi-player video game. It should be appreciated that the network topology illustrated in FIG. 1B has been greatly simplified and that more networks and nodes may be utilized such as, for example, that depicted in FIG. 1A. These topologies and devices should be apparent to those skilled in the art. It should also be appreciated the example systems described in FIGS. 1A and 1B are merely illustrative and that other implementations might be utilized. Additionally, it should be appreciated that the functionality disclosed herein might be implemented in software, hardware or a combination of software and hardware. Other implementations should be apparent to those skilled in the art. It should also be appreciated that a server or other computing device may comprise any combination of hardware or software that can interact and perform the described types of functionality, including without limitation desktop or other computers, database servers, network storage devices and other network devices.

Referring to the embodiment depicted in FIG. 1A, it will further be appreciated that in some example scenarios, computing systems 120, hubs 124, and user systems 130 may be distributed over significant distances and be geographically remote from each other. For example, hub 124*a* and simulation servers 120*a* and 120*b* may be located on the east coast of the United States, while hub 124*b* and simulation servers 120*c* and 120*d* may be located on the west coast of the United States. The processing disclosed herein is adapted to alleviate latency issues that may arise in such a scenario.

It will be appreciated that hubs 124 provide a buffer between the computing servers 120 and user systems 130 and may be programmed to selectively reassign user systems to improve system performance. The buffer formed by the communication hubs allows computing servers 120 to devote resources to providing a service without maintaining direct connections with user systems 130. Hubs 124 provide a layer of security between the client devices and the simulation servers and, due to their coupling with other hubs, reduce the possibility of a single point of failure preventing access to a simulation server. The buffer provided by hubs 124 allows computing servers 120 to be added and removed from the network without interfering with connections made by particular user systems 130. Accordingly, simulation capacity may be scaled independently of client capacity and may be scaled without exponentially increasing network traffic. User systems 130 may be switched between hubs so as to be connected to a hub that is already receiving information of particular interest from a computing server. For example, in a scenario wherein a user system 130 wishes to receive information relating to a particular subject or area of interest in a gaming environment, the communication hub 124 to which the particular user system 130 is currently connected may reassign or redirect the user system 130 to another communication hub 124 that is already receiving the information of interest. In other words, hubs 124 are programmed to switch connected user systems 130 to another hub 124 in the network that is most appropriate for the user system's current activity. By making such switches between hubs, the performance of the hubs and the network is improved, in addition to providing a better user experience.

Figure 2:
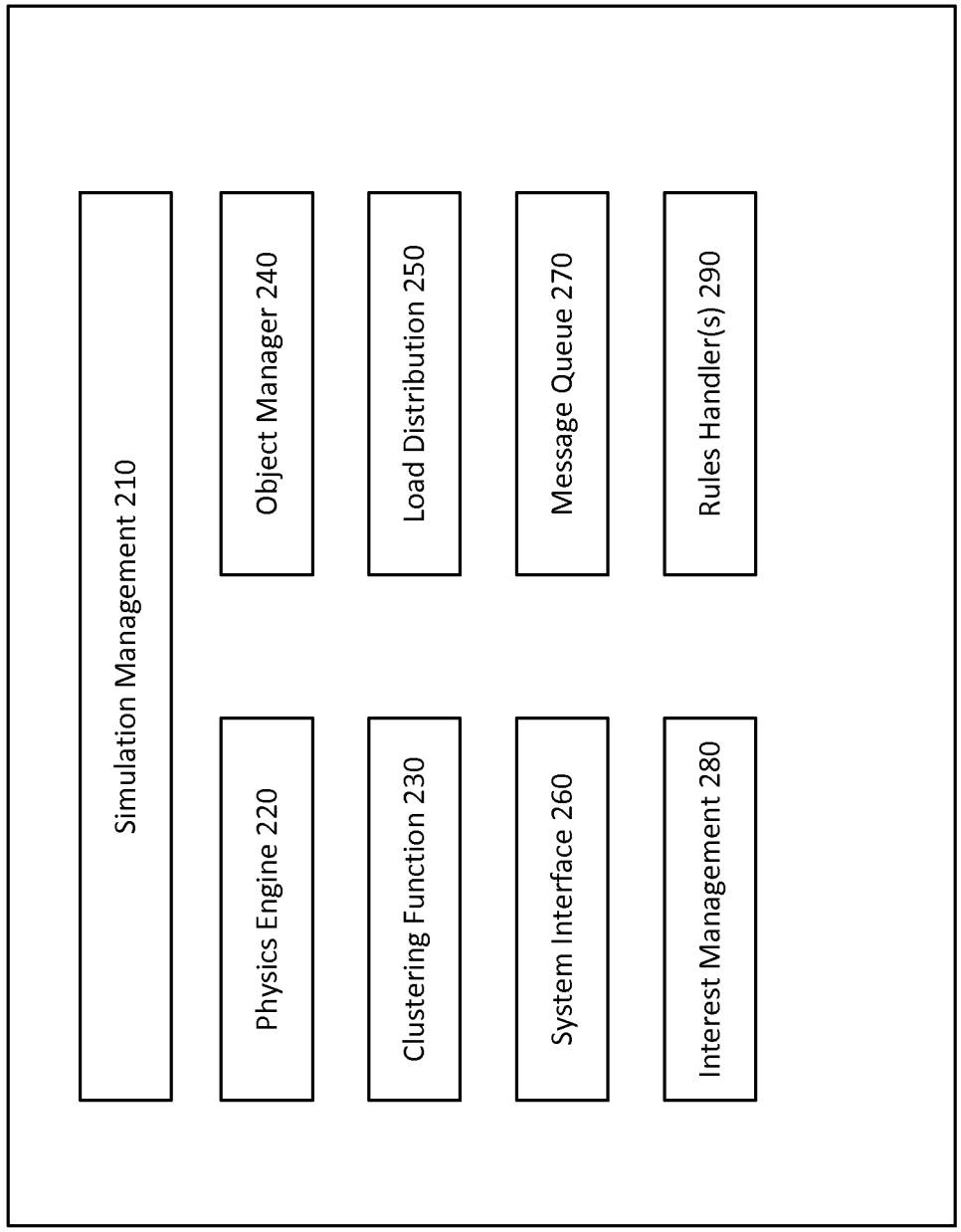
FIG. 2 depicts functional components of an example computing node.

FIG. 2 depicts a block diagram illustrating example functional components or modules that may be comprised in example computing systems 120*a-f*. As shown, in an example embodiment, a computing system 120 may include, for example, a simulation management function or module 210 that may be configured to monitor and manage the various processes and functions for owning and simulating objects in the simulation scenario. Computing system 120 may also include a physics engine 220 configured to generate real-time simulation of objects including body dynamics and interactions with other objects. The physics engine 220 may be configured to simulate real world physics in multiple dimensions. The physics engine 220 may compute rigid body dynamics, soft body physics, and other dynamics depending on the application. In some example embodiments, a computing system 120 that provides simulation of objects may include a clustering function 230 for analyzing objects and, using a clustering algorithm, grouping objects based on input parameters and desired cluster characteristics.

In an example embodiment, a computing system 120 that provides simulation of objects may also include an object manager 240 configured to track and manage the various objects that are owned by the node as well as objects for which the node has replicas. A computing node 120 configured for simulation of objects may also include a load distribution function or module 250 that provides functionality for determining how to reallocate objects and distribute simulation processing loads among multiple nodes of the system. A computing node configured for simulation of objects may also include system interface functionality 260 that manages and coordinates communications with other nodes in the multi-node system. Messages for transmission or messages that have been received from other nodes may be queued in message queue 270 until they are processed. Additionally, in the case where there are ownership of an object for which the node has a replica may be changed, messages pertaining to the replica may be placed in message queue 270. Upon confirmation by the owner node of a change in ownership of the replica, queued messages from the new owning node may then be processed. In cases where replicas are already in use by the node that becomes a new owner, some reduction in transmission and processing overhead may still be realized using the techniques described herein.

In an example embodiment, computing node 120 may still further comprise interest management module or function 280 and one or more rules handler modules 290. Rules hander modules 290 operate to process object subscription rule sets that may be received at a computing node 120. The rules handler modules 290 identify which rule sets have been received at a particular computing node. Interest management module 280 may be adapted to identify subscription rules that correspond to particular data objects on a computing system. Interest management module 280 marks the data objects that correspond to subscription rules for copying to the particular computing nodes that correspond to the applicable subscription rule. Data objects that are marked for copying may be copied to the appropriate computing node by object manager 240. Interest management module 280 in cooperation with rules handler modules 290 operates to minimize data transfer throughout the network by designating only those data objects that are needed by other nodes for communication across the network.

It will be appreciated that while FIG. 2 depicts the functional components or modules existing on a single computing node 120, each of a plurality of computing nodes in a network may comprise a similar set of functional modules. In an example embodiment, each computing node in a network of nodes uses its computing modules, perhaps in cooperation with the modules existing on other nodes, to provide the functionality as described herein. It will further be appreciated that some nodes may not comprise all functional modules as some nodes may be involved in performing only a subset of the functions described herein.

Computing nodes 120, 124, and 130 operate to distribute the computing load amongst nodes in the network. The distribution may be made by adding or removing nodes as needed based upon performance metrics and using information such as object proximity, interaction dependencies, as well as other heuristics. Example processing for distributing computing load is described in detail below in connection with FIGS. 3-7.

Computing nodes also operate to dynamically propagate data objects amongst the computing nodes. Data objects are propagated consistent with received subscription rules that specify characteristics of data object suitable for use at each particular node in the network. Example processing for propagating data objects amongst computing nodes in a network of nodes is described in detail below in connection with FIGS. 8, 9A, 9B, and 9C.

Example Distribution of Processing Load

Physics simulation is one of the most computationally expensive tasks encountered today in complex computing scenarios such as multi-player gaming. When a simulated multi-dimensional environment is implemented, simulation responsibilities may be divided and the divisions of the multi-dimensional environment may be distributed to the nodes of a multi-node system for parallel processing. Since multiple nodes may need to keep track of objects in the multi-dimensional environment, simulated objects of the multi-dimensional environment are typically processed by a master node and replicated across other nodes of the multi-node system. The simulated objects may include, for example, vehicles (e.g., cars, planes, etc.), projectiles, animals, other objects of nature (e.g., clouds, storm systems, etc.) that may exist in a simulated environment and that can be simulated using a physics engine or other simulation program. Nodes may keep track of the replicated objects by receiving information about the movement of the simulated objects from the master node. The replicated objects may be regularly synchronized with respect to position, orientation, linear and angular velocity, etc. based on the information from the master node, thus allowing for each node to maintain a synchronized model of the multi-dimensional environment.

In the example of a simulation scenario that includes a large-scale multiplayer action video game, the game scenario may include a vast simulated universe that employs the simulation of multiple worlds, characters, and interacting objects that may be implemented across multiple computing nodes. During the course of play, large numbers of objects (e.g., vehicles, projectiles, animals, other elements of nature, etc.) may be created, destroyed, moved, and interact, all of which may be tracked and simulated by the computing nodes. Many objects may move across computing node boundaries during the course of play, resulting in a significant amount of data that may be transmitted between the computing nodes as simulation responsibility for the objects are transferred between computing nodes. Accordingly, a significant amount of jitter may result from the continuous delays resulting from the numerous transfers.

A computing node that has simulation authority over an object is responsible for generating the simulation parameters for the object that will be sent to other computing nodes for use in tracking replicas of the object.

The ability to scale the simulation tasks to large numbers of nodes such as servers is important to the continued growth of multi-node applications such as multi-player games. Based on the nature of physics engines and their operation, one preferred way to distribute computational tasks across multiple nodes for a simulated world is to use a spatial subdivision. While one solution is to divide the simulated world into equally sized volumes, this may result in wasted computational resources. In many cases some volumes may end up generating a high computational load, resulting in computational delays and thus delays and jitter.

However, it is still desirable to distribute simulation responsibilities to the computing nodes of the multi-node system in order to better distribute processing load. In this way, simulations of objects may be performed by computing nodes having regions that are more proximate to the simulated objects. The results of the local simulations may be merged or combined by a master node and the synchronized results may be sent to the individual computing nodes. However, as objects in the multi-dimensional scenario interact and move relative to space, some regions may collect larger numbers of actively simulated objects. In some cases large numbers of such objects may end up in one volume, generating a significant computational load for the computing node responsible for that volume. The high computational load may result in delayed processing of the simulation tasks, resulting in delays in generating outputs from that node.

Such delays can result in jitter, which may generally be defined as any deviation from the expected refresh rate of graphics being generated by the multi-node network. Jitter may be observed in characteristics such as the frequency of successive pulses, the signal amplitude, or phase of periodic signals. The amount of jitter may vary depending on the network conditions and physics simulation parameters, but such jitter will typically result in graphics artifacts that generate undesirable video deficiencies for end users. For example, when an object, such as a projectile, is moving across the screen and encounters jitter, the user may perceive that the projectile has jumped from one location to another, rather than smoothly following the natural path of motion. As another example, a user may select a command that should cause movement of an object on the user's screen. However, due to jitter it may appear to the user that the user has not properly selected the command, in which case the user may repeat the selection action, causing undesired effects.

Accordingly, it would be desirable to implement a dynamic and adaptable schema to divide the simulation tasks in a multi-node environment. In one embodiment, based on the nature of physics simulations, it can be observed that a large portion of processing loads during simulation occurs while processing simulation islands. In some simulation scenarios, a group of interacting objects may be referred to as a simulation island. A simulation island may be a group of actively simulated objects that are in interacting with each other. Additionally, many network issues such as jitter and lag may occur between interacting objects within a simulation island due to the high level of interaction among the objects in a simulation island, which is exacerbated when simulation responsibility for an island is split between two computing nodes. Splitting may occur when simulation islands become so large that maintaining simulation processing for the objects of the simulation island by a single computing node becomes difficult or impossible. By reducing the splitting of simulation islands, stability of simulations may be maintained while avoiding jitter. On the other hand, it is also important for the efficient parallelization of the simulation process to utilize multi-node architectures and process simulation islands in parallel, in particular when the simulation islands become large and splitting of simulation islands becomes a necessity.

In one embodiment, clusters of simulation islands may be formed and the formed clusters may be used to divide the simulated environment. Formation of clusters can refer to initial assignment of objects to nodes during initial allocation of objects to computing nodes. Formation of clusters can also refer to rearrangement and reassignment of objects during the course of simulation.

In an embodiment, the areas or volumes of a simulation island may be considered in the formation or splitting of clusters. By considering the areas and volumes and not just the clustering points, the splitting of simulation islands can be reduced. In other embodiments, various approaches to building clusters of nearby points and/or simulation islands may be employed.

In some embodiments, weights can be assigned to simulation islands to be used for the allocation of the simulation islands to nodes. For example, the weight of a simulation island can be determined by properties such as the spatial distribution, e.g., the number of objects, density of objects, or number of contacts (depending on the specific simulation). The clusters can then be built around the highest weighted simulation islands.

As used herein, the ownership of an object can include having control over the creation or destruction of an object, as well as final decisions regarding transfer of ownership of the object. Owners of an object may also have simulation authority over the object, the results of which may be sent to nodes to synchronize the state of the simulated object with replicas in the simulation scenario.

Although some examples of the disclosed subject matter are provided in the context of simulation of a three-dimensional simulated environment, such as a video game or interactive content, the principles can be applied to any type of simulation involving multiple nodes in a distributed environment, where simulation and other processing loads may dynamically change between nodes. For example, in the context of a large-scale multiplayer action video game, many objects may be part of a group of objects (also referred to as a simulation island) which may in turn move across computing node boundaries during the course of play, resulting in a significant amount of data that must transmitted between the computing nodes as simulation responsibility for the objects and characters are transferred between computing nodes for the simulation islands or as the simulation islands are split and passed to different computing nodes for simulation. Some examples of simulation islands may include objects in a moving vehicle, a school of fish, a group of migrating birds, or a group of clouds in a moving storm system. By managing and controlling the splitting of simulation islands to allow for increased efficiency of continued processing and minimization of delays that can lead to jitter, disruptions to the continued simulation of the video game may be avoided, thus improving the user experience.

Figure 3:
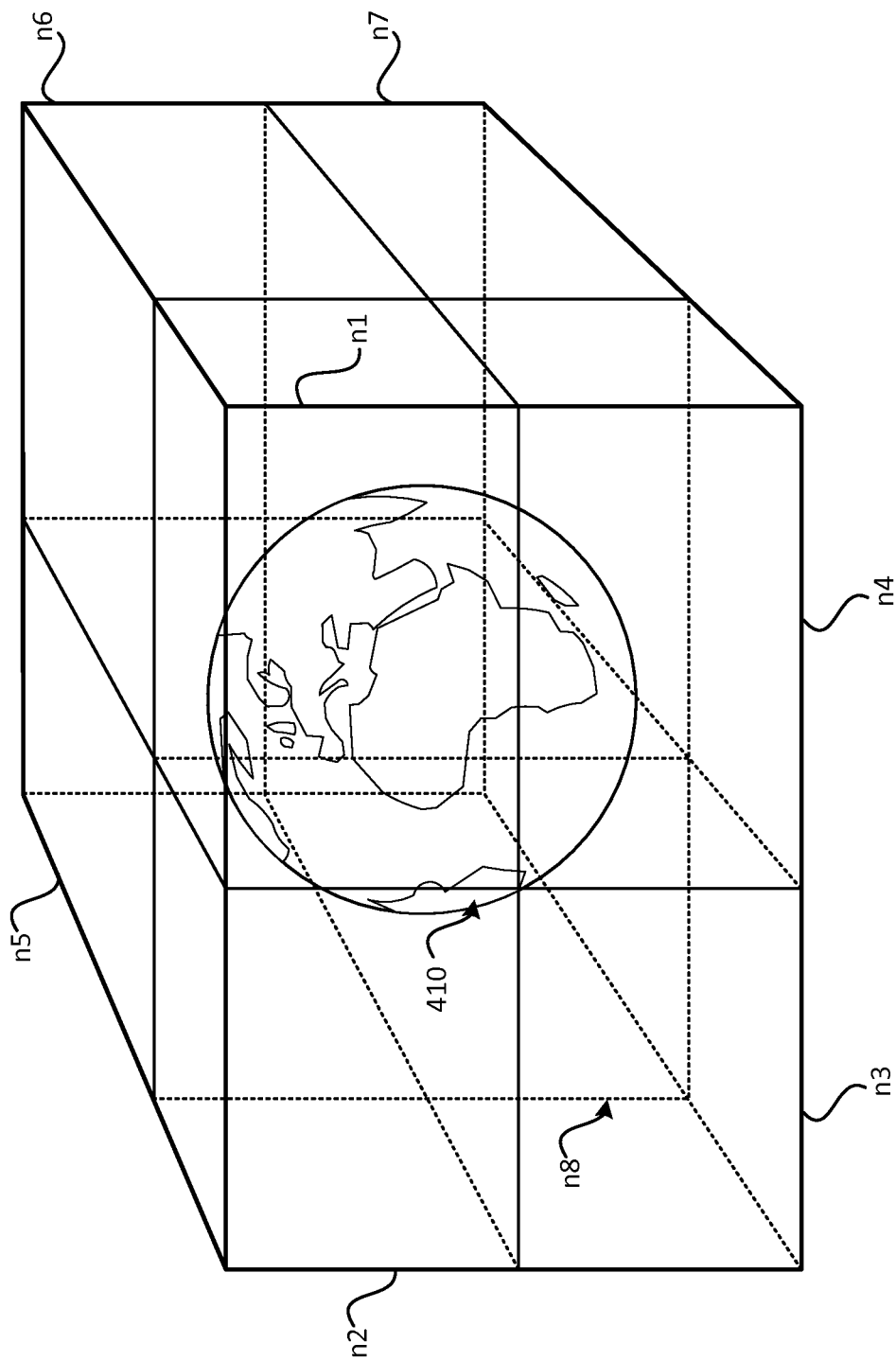
FIG. 3 depicts an example three-dimensional simulation and assignment of regions to nodes.

Referring to FIG. 3, illustrated is an example multi-node implementation of a simulation scenario. Illustrated is a simulated three-dimensional world 410, which is divided into eight regions. Each of the eight regions may be assigned to one of eight nodes n1 through n8. In some examples, the nodes may be a computing device such as a server, as described in further detail below. Furthermore, in some examples the simulated three-dimensional world 410 may be divided based on three-dimensional space and geography. Each assigned node may be assigned ownership of objects within the respective assigned region. Initially, the assigned nodes may be assigned simulation authority for objects within the respective assigned regions. As the simulation of the simulated three-dimensional world 410 progresses, objects may be caused to move from one region to another and interact with objects in other regions owned by other nodes. Furthermore, objects that need to be tracked by more than one node may be replicated and the movement of the replicated objects may be synchronized to maintain accuracy and fidelity of the simulation as a whole.

Ownership may further be allocated using factors so that the processing load can be more evenly distributed between computing nodes. For example, ownership of objects may be distributed based on computing capacity of the computing nodes. In some examples, ownership may be allocated among computing nodes based on processing power, available memory capacity, and other computing attributes of nodes. Some computing nodes may have different configurations, resulting in different computing nodes having different capabilities for simulation processing. Additionally, it may be advantageous in some cases to keep simulation of objects of a particular type (e.g., weapons, vehicles, etc.) with one computing node. For example, objects associated with a particular group or objects that have are known to interact frequently an amount of interaction with other objects owned by the computing node may be assigned to the computing node for ownership.

Objects may also be initially assigned based on volume/density/number of objects in a region. In this way, for example, if one particular region has all of the objects, multiple nodes may be assigned that region and the remaining node or nodes may be assigned the other regions, since processing demand for regions with little to no objects may be less intensive. Furthermore, initial assignment may be based on anticipated or predicted object interaction, for example knowing that certain characters have a high probability of interacting with each other. In some scenarios the initial assignment may be determined as a function of the particular application and the expected distribution of processing tasks that may affect processing load in addition to the processing loads due to simulation of objects.

As the simulation of the simulated three-dimensional world 410 progresses, for example as a video game is played, objects may be caused to move from one region to another and interact with objects in other regions owned by other nodes. Furthermore, objects that need to be tracked by more than one node may be replicated and the movement of the replicated objects may be synchronized to maintain accuracy and fidelity of the simulation as a whole. Objects may include, for example, geographical terrain, rocks, trees, bodies of water, structures such as buildings and towers, animals, characters, projectiles, persons, fictional creatures, aircraft, spacecraft, and the like.

In one example of simulation authority of an object, a computing node that is performing simulation of an assigned region of a simulated universe as well as objects within the assigned region may track three groups of objects. The first group of objects may include objects for which the computing node has simulation authority. The computing node may perform simulation of these objects using a physics engine or other simulation engine, and may also send calculated simulation information to the other computing nodes so that the other nodes may track the movement of these simulated objects.

The second group of objects may include objects that the computing node is not currently simulating but is tracking. The computing node may track such objects to maintain awareness of actions occurring at the boundaries of the computing node's assigned region. In some embodiments, the computing node may maintain replicas to track objects in this second group. Replicas are copies of objects that may be tracked by a computing node. The computing node may receive updated information regarding the location and movement of the replicas from nodes that have simulation authority of the replicas.

The third group of objects may include objects that the computing node is not currently simulating and is tracking, but which is currently not being simulated by another computing node. Such objects may have been previously simulated by another computing node, but that computing node may have relinquished simulation authority for that object. A computing node may relinquish simulation authority for an object when simulation of the object is no longer be needed. For example, an object may have come to rest and is no longer interacting with other objects, and therefore the object may not need to be actively simulated for at least a time. The computing node may continue to track replicas that are both being simulated or that are not being simulated in order to maintain awareness of these objects in the event that future motion of simulated objects result in an interaction with the replicas.

When motion of simulated objects results in an interaction with a replica that is not currently being simulated, the computing node may determine whether to assume simulation authority of the replica based on one or more of the criteria described above. For example, if the replica is at the boundary of the computing node's assigned region, and if the anticipated interaction with the object may result in movement of the replica into the computing node's assigned region, then the computing node may determine to assume simulation authority of the replica.

In another example, a replica that is actively being simulated by another computing node may move into the assigned region of the computing node. Based on one or more of the above criteria, the computing node may determine to assume simulation authority of the replica. For example, the computing node may determine that the replica will enter the assigned region of the computing node, and will further interact with other objects for which the computing node has simulation authority.

The disclosed examples illustrate implementation of changes in simulation authority, but the principles can also be applied to changes of ownership by the nodes.

In some examples, only one node may be allowed to have master simulation authority of a given object in order to avoid conflicts and inconsistencies in the simulation. In some situations, master simulation authority and other aspects of ownership for an object may be transferred from one node to another. For example, an object may have more interactions with objects assigned to a node other than the current node that has simulation authority.

As mentioned, clustering algorithms may be used to analyze the simulated objects and determine how to split or merge groupings or simulation islands of objects. Clustering algorithms may generally be used for grouping objects into groups based on, for example, similarities between objects. Some embodiments may employ various clustering algorithms that can be used to group sets or clusters of simulated objects based on some measure of similarity, such as distance, density, or some statistical distribution. The specific clustering algorithm and parameters may be selected based on the simulation. The clustering algorithm may be changed during a simulation session or may be changed between sessions. The clustering algorithm may be used for splitting a simulation island, for example, into two simulation islands that are approximately equal in size. In one embodiment, k-means clustering may be used for cluster analysis. Other clustering algorithms such as hierarchical clustering, distribution-based clustering, density-based clustering, and shared-property clustering.

In K-means clustering, a user-specified number of clusters are determined that are represented by their prototypes or centroids. The centroid may be determined as the mean of a group of points, and may be applied to objects in a three-dimensional space. In one embodiment, a number K of a number of initial centroids may be chosen, where K is a user-specified parameter indicative of the number of desired clusters. Each object may be assigned to the closest centroid, and each grouping of objects assigned to a centroid may be defined as a cluster. The centroid of each cluster may then be updated based on the objects assigned to the cluster. These steps may be repeated until no more objects change clusters, or until the centroids remain the same. In an embodiment, the following algorithm may be implemented:

Select K points as initial centroids;

Form K clusters by assigning each point to its closest centroid;

Re-compute the centroid of each cluster; and

Repeat forming and re-computing steps until centroids do not change.

Initially, objects may be assigned to the initial centroids which are initially all in the entire group of objects. After objects are assigned to a centroid, the centroid may be updated. Next, objects may be assigned to the updated centroids, and the centroids may be updated.

In some embodiments, simulation islands may be represented by a bounding box, and characterized by the number of objects in the simulation island. Additionally, geometric parameters such as volume can be considered in the formation of simulation islands, and proportional measures such as the density can be used. Weights of simulation islands can be defined based on numbers of objects in a given volume or density. For example, a simulation island that has 50 objects in a volume of 100 square meters (as simulated) may be assigned a weight of 0.5, while a simulation island that has 25 objects in a volume of 100 square meters (as simulated) may be assigned a weight of 0.25.

Various thresholds can be selected and used to determine when to analyze loads and make a decision as to whether the allocation of objects should be changed. For example, a high threshold can be defined and selected to determine when objects assigned to a node should be split, and a low threshold can be defined and selected to determine when objects assigned to a node should be merged. In one embodiment, a high threshold can be defined and selected as a percentage of processing capacity used for a node (e.g., 80%). Then, when the number of objects being simulated or processed by a particular node reaches 80%, that can signal or identify that objects, or at least a subset of the objects, in the simulation scenario should be reassigned. A clustering algorithm can be executed to determine new groupings by increasing the number of desired clusters. For example, if it is determined that a computing node has reached the high threshold and that the computing node has a single simulation island, then a K-means clustering algorithm may be applied with a desired K number of three to break the simulation island into three smaller groupings.

As another example, a low threshold can be defined and selected as a low percentage of processing load used for a node (e.g., 10%). Then, when the number of objects being simulated or processed by a particular node reaches 10%, that can signal or identify that objects, or at least a subset of the objects, in the simulation scenario should be reassigned. A clustering algorithm can be executed to determine new groupings by decreasing the number of desired clusters. For example, if it is determined that a computing node has reached the low threshold, then a clustering algorithm may be applied to simulation islands assigned to computing nodes surrounding the computing node with the low threshold. A K-means clustering algorithm may be executed with a lower K number in order to merge the number of simulation islands into smaller numbers of groupings.

In some embodiments, processing times for node outputs can be used instead of processing capacity. For example, the average processing time for a video frame output by a node can be used as a threshold, based on a minimum desired frame rate (e g, minimum 35 ms/frame over the previous 10 seconds based on a desired frame rate of 30 frames/sec).

In some embodiments, a coordinator function may be implemented in one or more of the computing nodes. The coordinator function may be configured to determine the high and low thresholds, which may be changed during the course of execution of the application to account for different simulation scenarios.

When a high or low threshold has been reached, the clustering algorithm can be executed to identify clusters or simulation islands of simulated objects, and a load distribution function can be executed to determine how to reallocate the simulation islands. The load distribution function may operate to distribute simulation processing loads among multiple nodes of the system. Through the use of the load distribution function, greater utilization efficiency of available node processing capacity can be obtained during the course of execution of the application, during which the processing needs can continuously change as the simulated scenario changes. The load distribution function can also be configured to distribute simulation loads to achieve greater levels of fault tolerance. The load distribution function can also be configured to continuously monitor the health of the nodes, detect unhealthy nodes, and automatically reallocate resources to healthy nodes until the unhealthy nodes have been restored. In some embodiments, the load distribution function may be configured to automatically scale the overall processing capacity to meet the demands of the simulation scenario (e.g., add new nodes to the system if processing requirements increase). The load distribution function may be implemented in one or more of the nodes of the system.

The load distribution function may be configured to determine which clustering properties are relevant for a given simulation scenario. For example, an expected processing capacity factor can be estimated for a simulation scenario and a processing load sharing scheduling algorithm can be executed for the number of available computing nodes. The expected processing capacity factor can be adjusted based on a quality-of-service factor that may be selected based on the desired level of service that is to be provided to end users. In some embodiments, the load distribution function may implement a pattern classification engine to identify relevant parameters. For example, the load distribution function may include an expert learning system that may include a learning function to continuously learn which properties are relevant to a particular simulation scenario. For example, the learning system may utilize logical inferences based on the available information for a simulation scenario. The learning system may take information pertaining to actual processing times for past simulation scenarios and use the information as input to a rules-based system to generate updated processing event probabilities.

In some embodiments the clustering algorithm may be supplemented with a selection algorithm or an induction algorithm to define groups. Probabilistic approaches, such as Bayesian inferencing, may also be incorporated. Generally, some type of estimation may be incorporated, such as a parametric classification technique. In some embodiments, the load distribution function may employ probabilistic methods to guide and narrow the parameters that are used to group objects into clusters. Depending on the complexity of the simulation scenario, some situations may preclude a deterministic or exhaustive solution. In some embodiments a heuristic model can be used to find satisfactory solutions that provide an acceptable confidence level in the results. For example, experience-based techniques, such as expert modeling can be used to aid in the initial selection of objects.

The load distribution function may be further be configured, using the various features described above, to make predictions regarding processing loads for the computing nodes. The predictions can be made based on current loads, expected simulation scenarios based on current simulation scenarios, expected interactions between objects, such as between characters and/or projectiles, and one or more prediction models. By using predictions, the load distribution function may anticipate processing loading issues and initiate analysis of objects and their movement, before thresholds are reached.

When it is determined that simulated objects should be moved from one node to another node for load redistribution, a procedure for transfer of ownership may be invoked. In some embodiments, the node that is to lose an object may initiate the process. In one embodiment, a broadcast message may be sent to the other nodes of the system to notify the nodes that a change of ownership is pending. The nodes that receive the broadcast message may wait to process any further information related to replicas of the pending object. For example, messages that are received from the current node that owns the pending object, as well as any other nodes regarding the pending object, may be placed in a message queue. The node that is to receive ownership of the pending object may then receive a copy of the pending object and synchronize current information for the pending object. Upon confirmation by the previous owner node that the change of ownership is acknowledged and completed, the new owner may broadcast a message to the other nodes indicating that the change in ownership for the pending object has been completed. Any queued messages regarding the pending object may then be processed, and some queued messages may be discarded as necessary.

Figure 4:
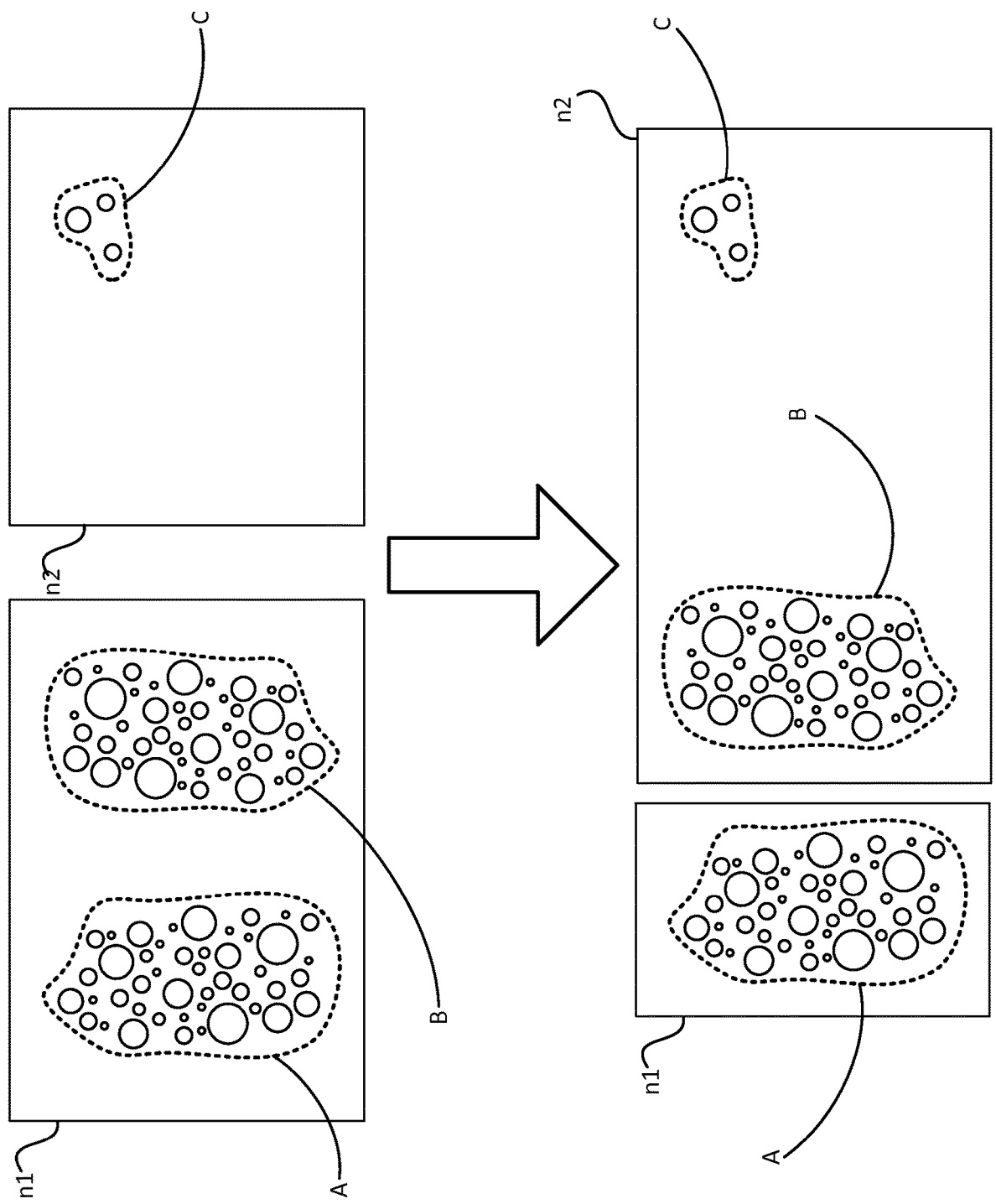
FIG. 4 depicts an example of changing object ownership.

FIG. 4 illustrates an example of the transfer of simulated objects between two nodes, in the case where the processing load of one or more nodes has reached a high threshold. In the example illustrated in FIG. 4, node n1 has ownership of simulated objects in group A and group B (which may not divided into groups initially). Node n2 has ownership of simulated objects in group C. A load distribution function may determine that the processing capacity of node n1 has exceeded a threshold value, and the load distribution function may be invoked to perform a clustering algorithm to determine ways to subdivide the objects owned by node n1. In this example, a high threshold may have been defined as a percentage of processing load used for node n1. It may be determined that node n1 has reached the high threshold, and that groups A and B should be reassigned. In another example, the average processing time for a video frame output by node n1 has reached a high threshold, such as based on a lower than desired frame rate. A clustering algorithm may be executed to determine new groupings that more evenly distribute the number of simulated objects between nodes n1 and n2. After executing the clustering algorithm, the load distribution function may determine that a number of the objects assigned to node n1 should be assigned to node n2. Furthermore, it may be determined that the objects of group B should be maintained in one simulation island. The load distribution function may thus determine that group B should be kept together and should be re-assigned from node n1 to node n2. After execution of the clustering algorithm, the objects may be grouped into group A and group B. The load distribution function may also determine that the number of objects owned by node n2 (shown as group C) represents a small processing load and that node n2 has reserve processing capacity to take on another group of objects from another node.

The load distribution function (or in some cases, node n1) may initiate the transfer of ownership of the objects in group B to node n2. After the transfer of ownership, node n1 is shown having ownership of the objects in group A, and node 2 is shown having ownership of the objects in group B. Node 2 may continue to retain ownership of the objects in group C.

Figure 5:
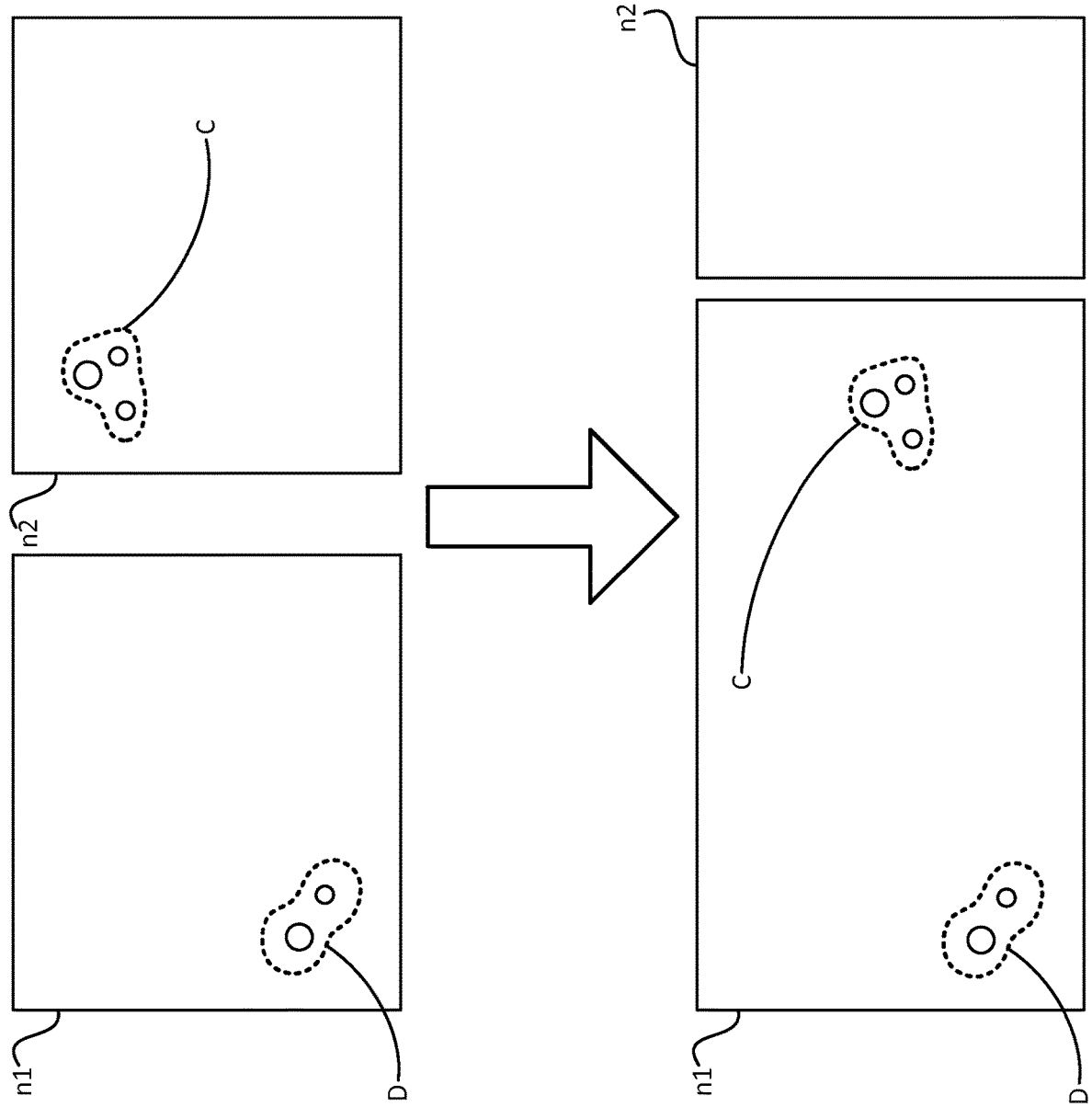
FIG. 5 depicts an example of changing object ownership.

In one embodiment, some criteria for determining a candidate node that can receive ownership of objects from an overloaded node may include:

1. the candidate node has ownership of at least one object that is interacting with an object in the group that is to be moved;

2. the candidate node has sufficient reserve computing capacity to perform simulation of the group of objects that is to be moved;

3. the candidate node claiming ownership has information about the group of objects that is to be moved; and 4. the candidate node has ownership of at least one object that is in spatial proximity with an object in the group that is to be moved;

FIG. 5 illustrates an example of the transfer of simulated objects between two nodes, in the case where the processing load of one or more nodes has reached a low threshold. In the example illustrated in FIG. 5, node n1 has ownership of simulated objects in group D. Node n2 has ownership of simulated objects in group C. A load distribution function may determine that the processing load of node n1 is below a threshold value, and the load distribution function may perform a clustering algorithm to determine ways to group the objects owned by node n1 with those of another node. In this example, a low threshold may have been defined as a percentage of processing load used for node n1. It may be determined that node n1 has reached the low threshold, and that groups A and B should be reassigned. In another example, the average processing time for a video frame output by node n1 has reached a low threshold, indicating that node n1 has capacity to take on more processing tasks. A clustering algorithm may be executed to determine new groupings for simulated objects in nodes n1 and n2. After executing the clustering algorithm, the load distribution function may determine that a number of the objects assigned to node n2 should be assigned to node n1. The load distribution function may thus determine that group C should be re-assigned from node n2 to node n1. After execution of the clustering algorithm, the clustering algorithm may determine that objects in group C and group D may be grouped together. The load distribution function may also determine that the number of objects owned by node n1 (shown as group D) represents a low computing load and that node n1 has reserve processing capacity to take on a group of objects from another node.

The load distribution function or node n1 may initiate the transfer of ownership of the objects in group C to node n1. After the transfer of ownership, node n1 is shown having ownership of the objects in group C and group 2, and node 2 is shown as not having ownership of any objects. In this way, node 2 may be made available for assuming ownership of a larger simulation island than may have been possible before group C was removed from node 2.

In an example, during startup of a simulation session, the simulated environment (e.g., a geographic region or area) may be divided into regions which are allocated to the nodes of the multi-node system. The nodes may then take ownership of all objects within the allocated regions. The initial allocation may be adjusted in some cases for load distribution purposes. For example, a region with two large simulation islands may be further divided into two regions. The load distribution function may be executed as the simulation progresses, to continuously adjust allocation to maintain load distribution.

In some examples, an owner of an object may retain full control of an object, including its creation, destruction, simulation, and control over updates to the object. In the examples described in this disclosure, the owner may have the ability to generate the simulation parameters (e.g., position, orientation, linear and angular velocity) of an object that is synchronized with all replicas of the object. The owner may delegate some aspects of ownership as well as other controls pertaining to an object that is owned. In the examples described herein, the owner may delegate or relinquish some of its simulation authority of an owned object while retaining other controls over the object. Aspects of authority and ownership are provided in U.S. patent application Ser. No. 14/859,189, "MULTI-NODE OBJECT SIMULATION," filed on Sep. 18, 2015, the entirety of which is hereby incorporated by reference.

In some simulation scenarios, a group of interacting objects may be referred to as a simulation island. A simulation island may be a group of actively simulated objects that are in contact with each other. For example, a simulation island can include a group of objects that interact with the simulated environment and each other and may remain in close proximity to each other, such as a group of characters and objects in a moving vehicle, a school of fish, a group of migrating birds, or a group of clouds in a moving storm system. In some examples, ownership of a simulation island may initially be assigned to a single node for computational efficiency. For example, when a simulation island is activated, simulation authority may be assigned to the node that activated the simulation island. When two simulation islands with ownership merge, the simulation islands may be evaluated to determine which node should assume ownership over the merged simulation islands. For example, the simulation islands may be scored based on a heuristic to determine which node should be assigned ownership. In some examples, ownership of an entire simulation island may be changed if there is no more simulation activity for any objects in the simulation island.

Figure 6:
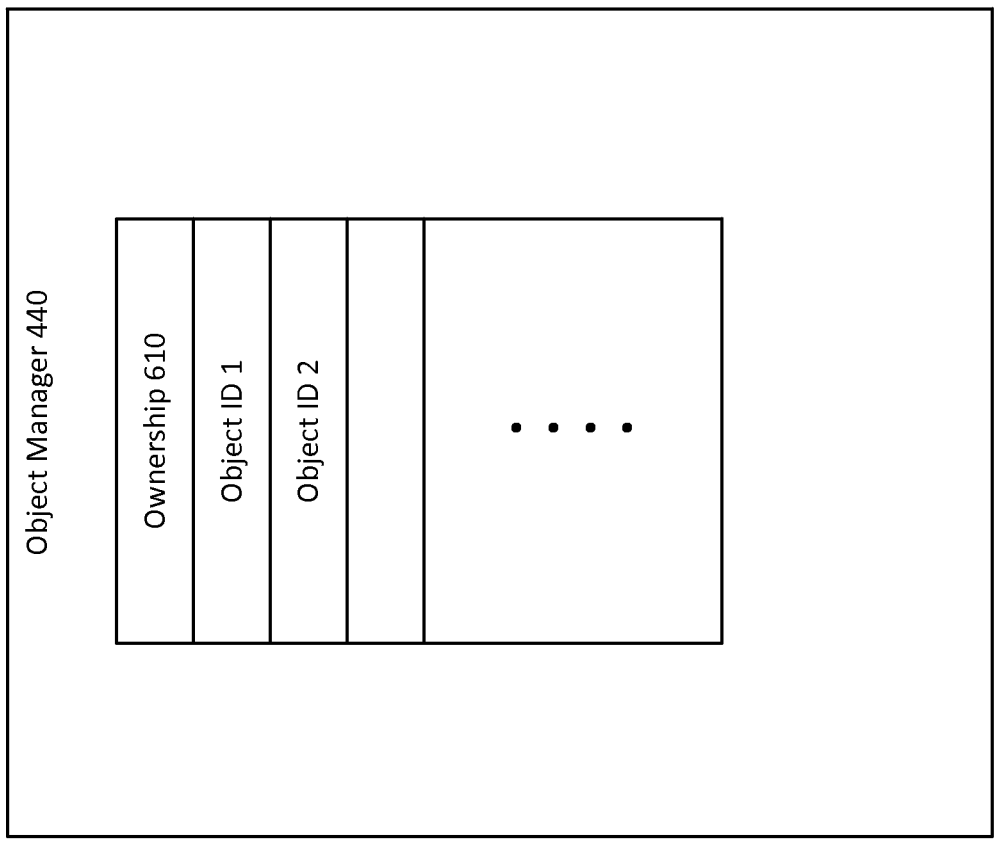
FIG. 6 depicts an example object manager.

FIG. 6 depicts further details of an object manager 240 as noted above in connection with FIG. 2. Object manager 240 may include ownership records 710 that include object identifiers for objects that are owned by the node. It will be appreciated by one skilled in the art that the data structure shown in FIG. 6 may represent a data file, a database table, an object stored in a computer memory, a programmatic structure or any other data container commonly known in the art. Each data element included in the data structure may represent one or more fields in a data file, one or more columns of a database table, one or more attributes of an object, one or more member variables of a programmatic structure or any other unit of data of a data structure commonly known in the art.

Figure 7:
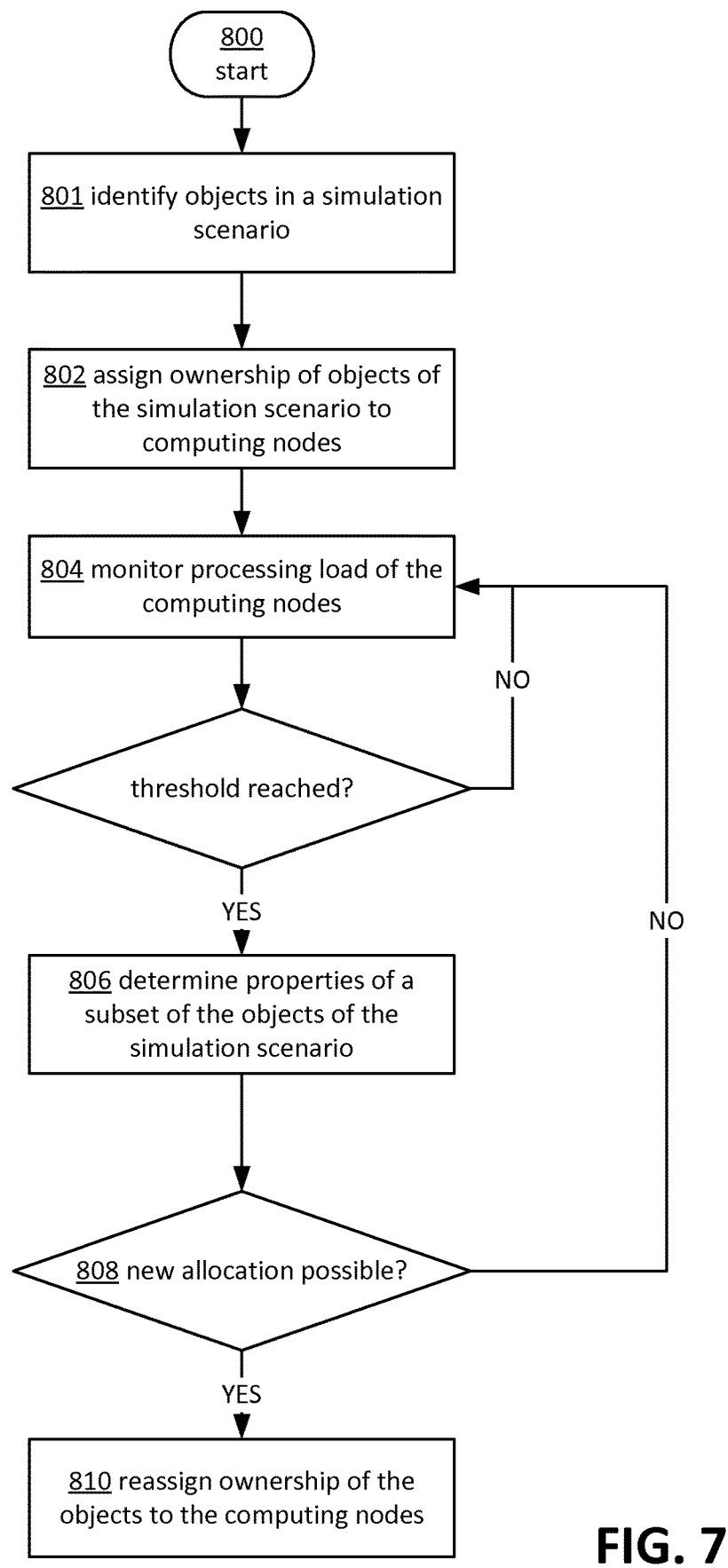
FIG. 7 depicts a flow diagram of example processing for adaptive distribution of simulated objects in a multi-node environment.

FIG. 7 illustrates an example operational procedure for adaptive distribution of simulated objects in a multi-node computing environment. In an embodiment, the operational procedure may be implemented in a system comprising one or more computing nodes in communication with each other. The computing nodes may have memories that have stored thereon computer-executable instructions that, when executed, cause the system to perform operations as described. In one embodiment, the system may comprise a computing node as depicted in FIGS. 1A and 1B. Referring to FIG. 7, operation 800 begins the operational procedure. Operation 800 may be followed by operation 801. Operation 801 illustrates identifying objects in a simulation scenario. The objects may include interacting objects that may be implemented across multiple computing nodes. The objects may include, for example, vehicles, projectiles, structures, and characters that may be created, destroyed, moved, and interact in a simulated environment.

Operation 801 may be followed by operation 802. Operation 802 illustrates assigning ownership of objects of a simulation scenario to the one or more computing nodes. The objects may be assigned based on factors such as the number of objects in a region of the simulation scenario, processing load for simulating the objects (e.g., processing load distribution associated with the simulation scenario), computing capacity of the computing nodes, and the spatial distribution of the objects. For example, a simulated three-dimensional world may be divided based on three-dimensional space and geography, and each of the plurality of nodes may be assigned ownership of objects within the respective assigned regions. In some examples, nodes may be assigned simulation authority for objects within the respective assigned regions. Additionally, objects that need to be tracked by more than one node may be replicated and the movement of the replicated objects may be synchronized. In further examples, the ownership of the objects are assigned to the plurality of nodes based at least in part on an object distribution scheme.

Operation 802 may be followed by operation 804. Operation 804 illustrates monitoring a processing load of the one or more computing nodes. For example, operation 404 may include monitoring processing loads associated with running the simulation scenario on the computing nodes during running of the simulation scenario. The processing load may be determined as a percentage of the maximum processing capacity of a computing node or a maximum video frame generation rate of a computing node, for example. The processing load may be based at least in part on, for example, the number of objects being simulated by particular computing nodes.

If a threshold value has been reached, then operation 804 may be followed by operation 806. Thresholds may be selected to determine when to analyze processing loads and determine whether to redistribute the allocation of objects to computing nodes. For example, a high threshold can be defined and selected to determine when objects assigned to a node should be split, and a low threshold can be defined and selected to determine when objects assigned to a node should be merged. The threshold value may comprise one of a maximum load and a minimum load. The threshold value may also comprise one of a maximum processing time and a minimum processing time. Operation 806 illustrates in response to the monitoring, determining one or more properties of a subset of the objects of the simulation scenario. The properties may be associated with interactions between objects of the subset. For example, the properties may be based on include a measure of interaction between objects of the subset. The measure of interaction may indicate a potential for interaction between objects. In some embodiments, such a potential for interaction may be inferred based on the spatial distribution of objects. In some examples, the spatial distribution properties may include a number of objects and/or a density of the objects of the simulation scenario. A higher density of objects in a group may increase the probability that a given object in a the group will interact with another object in the group. In some examples, the interactions between the subset of objects may identify simulation islands. A simulation island may be a group of simulated objects, where some or all of the group of simulated objects that are interacting with each other or have a high probability of interacting with each other. A simulation island may be characterized by properties such as the spatial distribution, e.g., the number of objects, density of objects, or number of contacts in the simulation island.

Operation 808 illustrates determining if a new allocation is possible. In some cases, a new allocation may be possible if, for example, at least one of the computing nodes are available for receiving additional allocations of the objects of the simulation scenario, such as when it is determined that at least one other computing node has not reached a threshold level. If a new allocation is possible and is determined to be necessary based on the properties, then operation 808 may be followed by operation 810. Operation 810 illustrates based at least in part on the one or more properties and the processing load, reassigning the ownership of the objects to the one or more computing nodes. In some examples, the reassigning step may be based at least in part on the one or more properties and the processing load of the plurality of computing nodes. For example, the reassigning step may include determining a level of interaction of the group of interacting objects. Additionally, the reassigning may include reallocating a group of objects to two or more nodes. Alternatively, the reassigning may comprise reallocating two groups of objects to one node. The reassigning may be based on spatial proximity of the objects.

In some examples, the determining step may be performed in response to determining that the processing load of at least one of the computing nodes has reached a threshold value. Additionally, the reassigning step may include clustering the objects to determine the subset.

Accordingly, per the example processing illustrated in connection with FIGS. 3-7, load balancing may be performed and, when needed, the processing load dynamically distributed amongst additional nodes in the network. In an example embodiment, a load balancing module monitors computing nodes that are performing processing relating to a plurality of data objects. When a threshold relating to processing by the nodes is reached, the nodes dynamically determine how to reallocate processing of the data objects amongst the computing nodes in the network. In an example embodiment, the computing nodes evaluate the existing groups of data objects to determine if the data objects could be clustered differently than under current processing. For example, a module operating on the computing nodes may determine that an existing grouping of data objects that is being processed by a single node should be divided into two or more groups. The module identifies a second computing node and transfers control of a portion of the data objects to the second computing node.

Example Data Object Propagation

According to an aspect of the disclosed embodiments, data objects are dynamically distributed or replicated to nodes in network 110 that have indicated an interest in the particular object. In an example embodiment, each computing node may have stored thereon rules sets that define the characteristics of the data objects that are suitable for distribution to the particular computing node. The rule sets of characteristics are communicated to other nodes in network 110. Upon receipt of the rule sets, the nodes evaluate the rule sets against the data objects that are stored on or controlled by the particular node. Based upon this comparison, the particular node identifies data objects that correspond to rule sets that have been received from other computing nodes. The node designates the identified data objects for forwarding to the computing node to which the rule set of characteristics corresponds. The designated object replicas are thereafter communicated to the corresponding computing node.

Figure 9A:
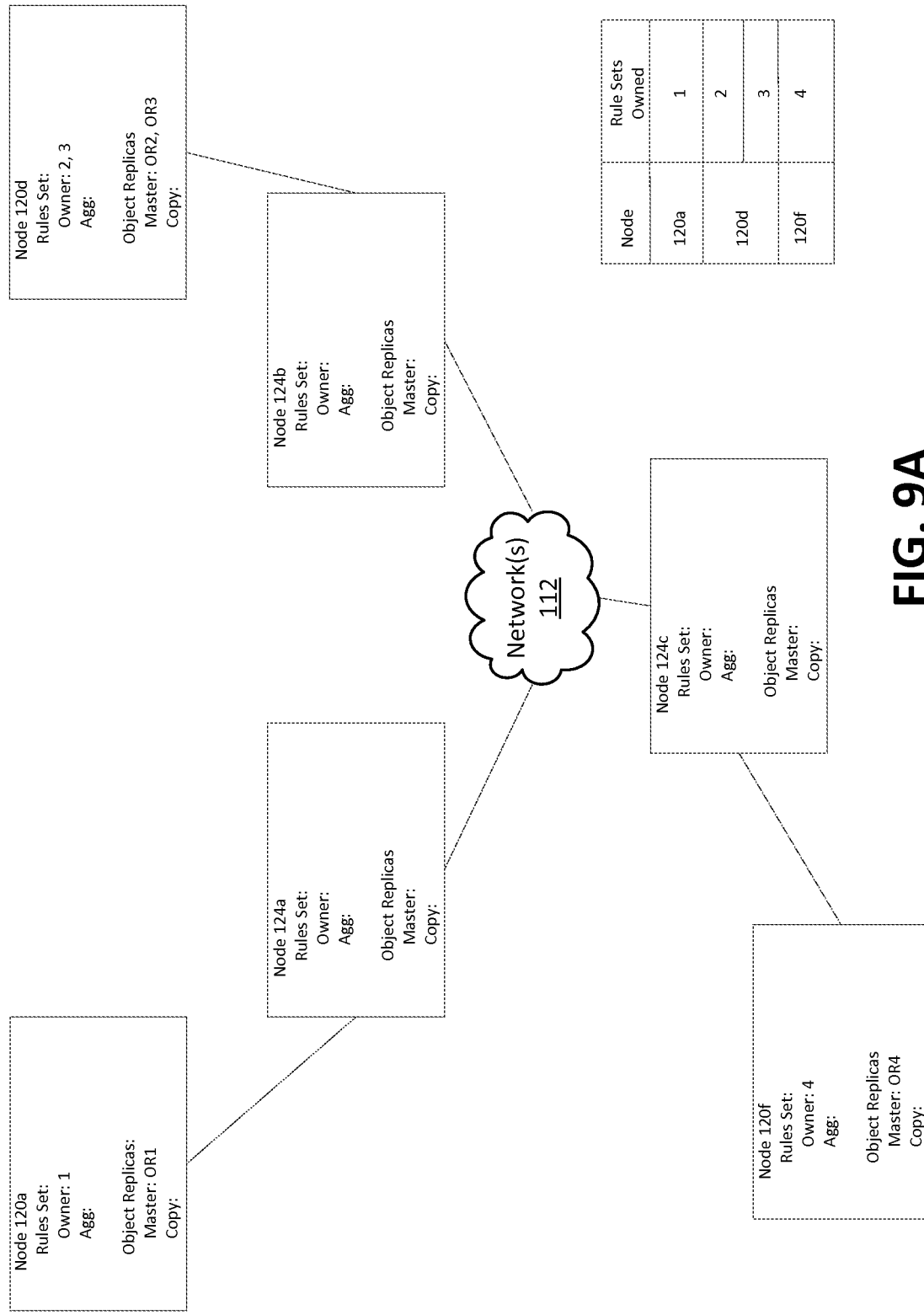
FIGS. 9A-C depict an example progression of subscription rules and data objects in a multi-node environment.

In an example scenario, computing nodes in network 110 have stored thereon rule sets defining characteristics of data objects that are suitable for distribution to the particular computing node. The rule sets may specify or quantify any type of characteristic that may be used to identify data objects suitable for delivery and use by computing nodes. For example, a subscription rule may specify a particular quality or characteristic of objects that should be transmitted to a corresponding computing node. In an example scenario wherein the service provided by the network is on-line gaming, subscription rules may specify characteristics of objects used in a gaming sequence. For example, the subscription rules may specify characteristics defining: a particular area of a gaming space, e.g., a bounding box or circular area within a gaming space; characteristics defining a particular bit mask; and characteristics defining a particular type of object in the game, e.g., an object representing a portal, an object representing a sword, or an object representing a teammate. An example computing arrangement illustrating the use of rule sets defining characteristics of data object is depicted in connection with FIG. 9A. In FIG. 9A, a subset of the computing nodes depicted in FIG. 1A is illustrated along with example rule sets associated with particular computing nodes. As shown in FIG. 9A, computing node 120a has a subscription rule set number 1 stored thereon. Rule set number 1 is associated with node 120a and specifies characteristics of data objects that should be distributed to node 120a. Similarly, computing node 120d has stored thereon, and is the owner of rule sets numbers 2 and 3. Rule sets numbers 2 and 3 are associated with node 120d and specify characteristics of data objects that should be distributed to node 120d. Still further, computing node 120f has stored thereon, and is the owner of rule set number 4. Rule set number 4 is associated with node 120f and specifies characteristics of data objects that should be distributed to node 120f. FIG. 9A comprises a chart that illustrates that rule set 1 corresponds to node 120a, rule sets 2 and 3 correspond to node 120d, and rule set 4 corresponds to node 120f.

Figure 8:
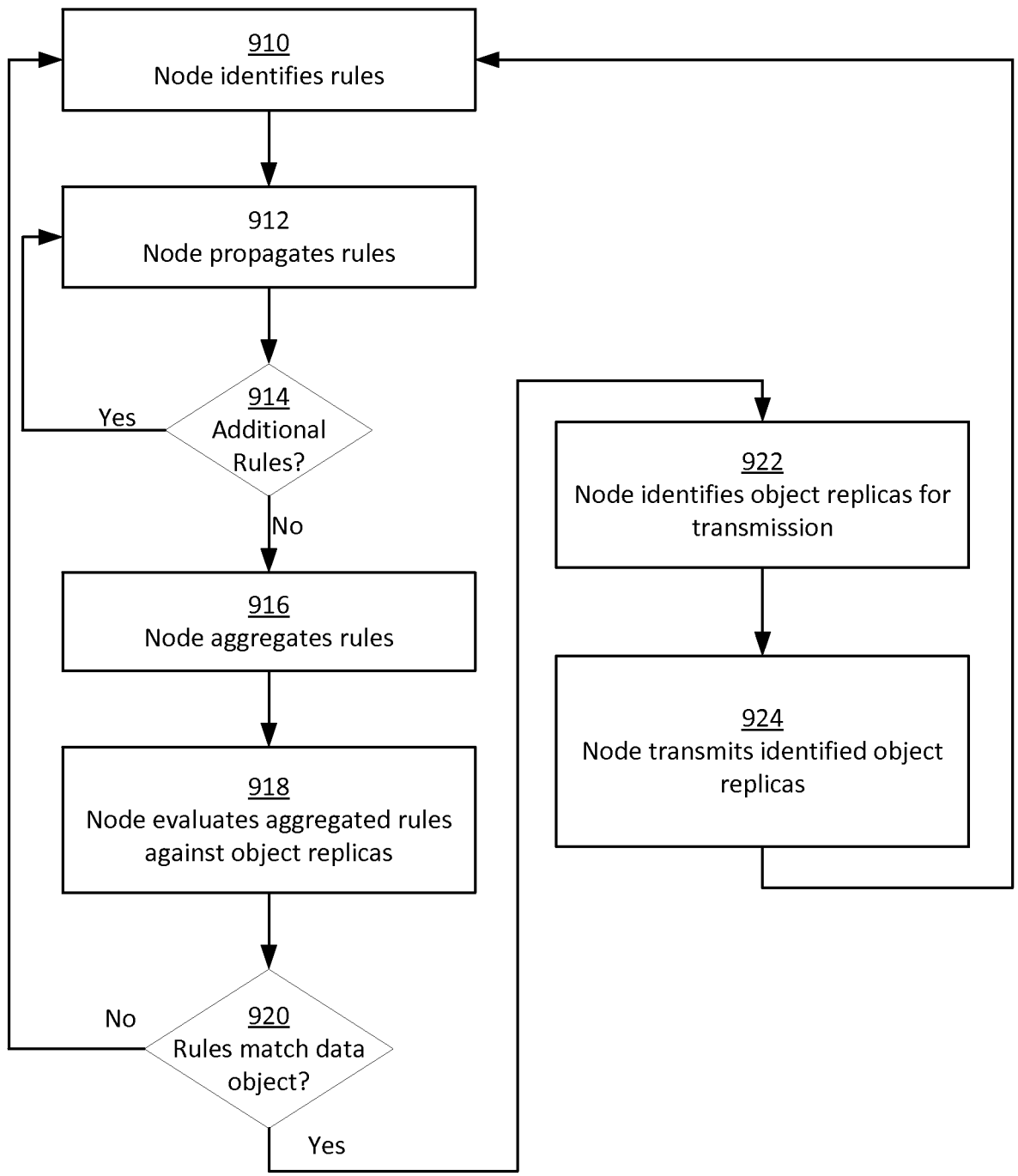
FIG. 8 depicts a flow diagram of example processing for propagating data objects in a multi-node environment.

FIG. 8 depicts a flow chart of example processing for identifying data objects for copying or replication in network 110. At block 910, computing nodes in network 110 identify the rule sets that are stored thereon. The processing may be performed, for example, by rules handler module 290. In an example scenario corresponding to that depicted in FIG. 9A, node 120a identifies that rule set number 1 is stored thereon, node 120d identifies that it has rule sets 2 and 3 stored thereon, and node 120f identifies that it has rule set 4 stored thereon.

At block 912, computing nodes in network 110 that have identified or determined themselves to have rules sets of characteristics thereon propagate the rule sets to other nodes in the network. In an example embodiment, computing nodes transmit their rule sets to computing nodes to which they are directly connected. Referring again to FIG. 9A, in an example scenario, computing node 120a, and in particular rules handler module 290 executing thereon transmits for receipt at computing node 124a subscription rule set number 1. Computing node 120d communicates rule sets 2 and 3 which are received at computing node 124b. Computing node 120f communicates rule set number 4 for receipt at computing node 124c.

When a computing node receives a rule set from another node, the computing node propagates the received rule set to other computing nodes. Accordingly, as shown at decision block 914, each computing node evaluates or determines whether or not additional rule sets have been received and require propagation. If so, processing continues at block 912 with the additional rule sets being transmitted. In an example embodiment, the computing nodes propagate the received rules sets to the computing nodes to which they have a direct connection, i.e., nodes that may be accessed without hopping other computing nodes. With reference to FIG. 9A, in an example scenario computing node 124a transmits for receipt at nodes 124b and 124c rule set number 1, which originated from computing node 120a. Similarly, node 124b transmits for receipt at nodes 124a and 124c subscription rule sets 2 and 3 which originated from computing node 120d. Still further, node 124c transmits for receipt at nodes 124a and 124b subscription rule 4 which was originally transmitted by computing node 120f.

Figure 9B:
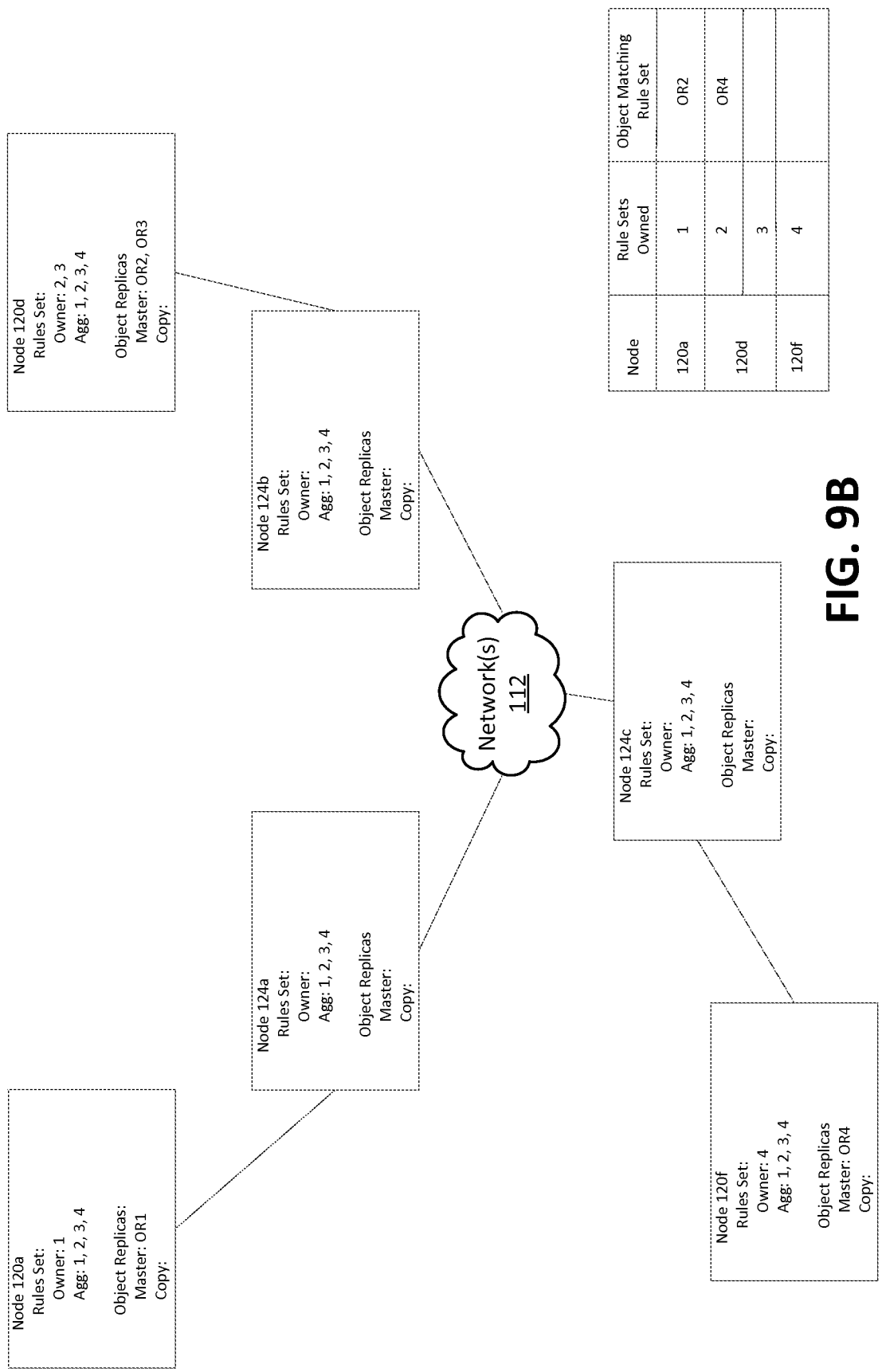

The propagation of rule sets from node to node continues until the rule sets have been propagated by all nodes to all nodes to which each node is attached. Referring to FIG. 8, processing continues between blocks 912 and 914 until no further rules require copying. FIG. 9B provides an illustration of the nodes depicted in FIG. 9A after the rule sets have been propagated. As shown, at the conclusion of the rule set propagation, each of the computing nodes in the network has a copy of each of the rule sets. Accordingly, each of the computing nodes has information specifying characteristics of object replicas that should be distributed to other of the computing nodes.

After processing at block 914 is complete, each of the computing nodes aggregates the rule sets that have been received at the particular computing node at block 916. In an example embodiment, the computing nodes generate a list comprising the rule sets originating from the particular computing node as well as any rule sets that were received and corresponding to other nodes in the network. The rules handler module 290 may be responsible for aggregating the rule sets. In an example embodiment, each rule set may have an associated type which corresponds to the characteristics the rule set relates. Further, in an example embodiment there may be a plurality of rules handler modules 290, with each rule set handler module 290 corresponding to a particular rule type. In such an embodiment, each rules handler module generates a list of the rule sets that correspond to that particular type.

At block 918, each of the computing nodes evaluates the rule sets defining characteristics against the data objects on the particular computing node. Each of the computing nodes determines whether the rule sets correspond to the attributes of the data object replicas on the particular computing node. For example, in a scenario wherein a rule set defines characteristics of a particular bit map, the computing node evaluates each data object replica thereon to determine whether the particular data object replica contains or corresponds to the particular bit map. In a scenario wherein a rule set defines characteristics defining a space in a virtual gaming area, the computing node evaluates each data object replica thereon to determine whether the attributes of the particular data object replica indicate that the replica is located in the defined space.

The attributes that are used in the evaluation may have been previously defined for the data objects or may be generated dynamically by evaluating features of the particular data object. For example, in a scenario wherein the rule set defines characteristics specifying a particular bit map, the computing node may process the particular data object to determine whether it comprises the bit map specified in the rule set.

In an example scenario wherein multiple rules handler modules 290 are responsible for processing rule sets of different types, each rule handler module 290 may evaluate the rule sets associated with the particular module against the data object. Each rule handler module 290 generates a list of objects having attributes that match or correspond to the characteristics defined by the rule sets. In an example embodiment, interest management module 280 merges the lists of objects generated by the rule handler modules 290. It will be appreciated that in an example embodiment, interest management module 290 tracks which objects are needed by each node in the network using an interest subscription model and coordinates between participants so that only useful data is transferred between nodes. For example, only objects useful for a particular computing system such as a simulation server are sent to the particular system. Likewise, in an example embodiment, hubs only receive object updates that are of interest to at least one of the clients connected to it.

Referring to FIG. 8, at block 920, each computing node determines whether the evaluation has identified any data objects corresponding to rule sets. If no rule sets correspond to a data object, processing continues at block 910 where the node determines whether additional subscription rules have been received. If at block 920 it is determined that one or more rule sets correspond to data objects on a particular node, processing continues at block 922.

At block 922, the computing nodes identify the object replicas that, based upon the evaluation of rules to object attributes, should be communicated to another computing node. In an example embodiment, the interest management module 280 identifies that each of the objects in the list of objects generated at block 916 should be communicated to a particular object node. Each of the rule sets has data associated therewith that identifies the computing node to which the particular rules originated from. In an example embodiment, interest management module 280 stores data indicating for a particular object replica that corresponds to a particular rule set that the data object should be communicated to the computing system that corresponds to the particular rule set. In other words, interest management module 280 marks the node for propagation to the owner of the corresponding rule set. Referring to the example illustrated in FIG. 9B, in a scenario wherein node 120d determines that the characteristics of rule set 1 correspond to or match the attributes of object replica OR3, interest management module 130 executing on node 120d stores data indicating the object replica OR3 should be transmitted or replicated to computing node 120a from which rule set 1 originated. Similarly, in a scenario wherein node 120f determines that rule set 2 corresponds to object OR4, interest management module 130 executing on node 120f stores data indicating the object replica OR4 should be transmitted or replicated to computing node 120d from which rule set 2 originated.

At block 924, the nodes in the network communicate or replicate any data object replicas that were identified or marked at block 918. In an example embodiment, object manager module 240 replicates the identified object replicas to the computing nodes that correspond to the matching rule set. Referring to the example illustrated in FIG. 9B, in a scenario wherein node 120d determined that rule set 1 matched the attributes of object replica OR2, object manager module 240 replicates replica OR2 to computing node 120a from which rule set 1 originated. Similarly, in a scenario wherein node 120f determines that rule set 2 corresponds to object OR4, replication management module 220 replicates object replica OR4 to computing node 120d from which rule set 2 originated. FIG. 9B comprises a chart in the lower right that illustrates matches between object replicas and rule sets owned by various nodes. In the example scenario illustrated, object replica OR3 is shown to match or correspond to rule set 1 owned by node 120a. Object replica OR4 is shown to match or correspond to rule set 2 owned by node 120d.

Figure 9C:
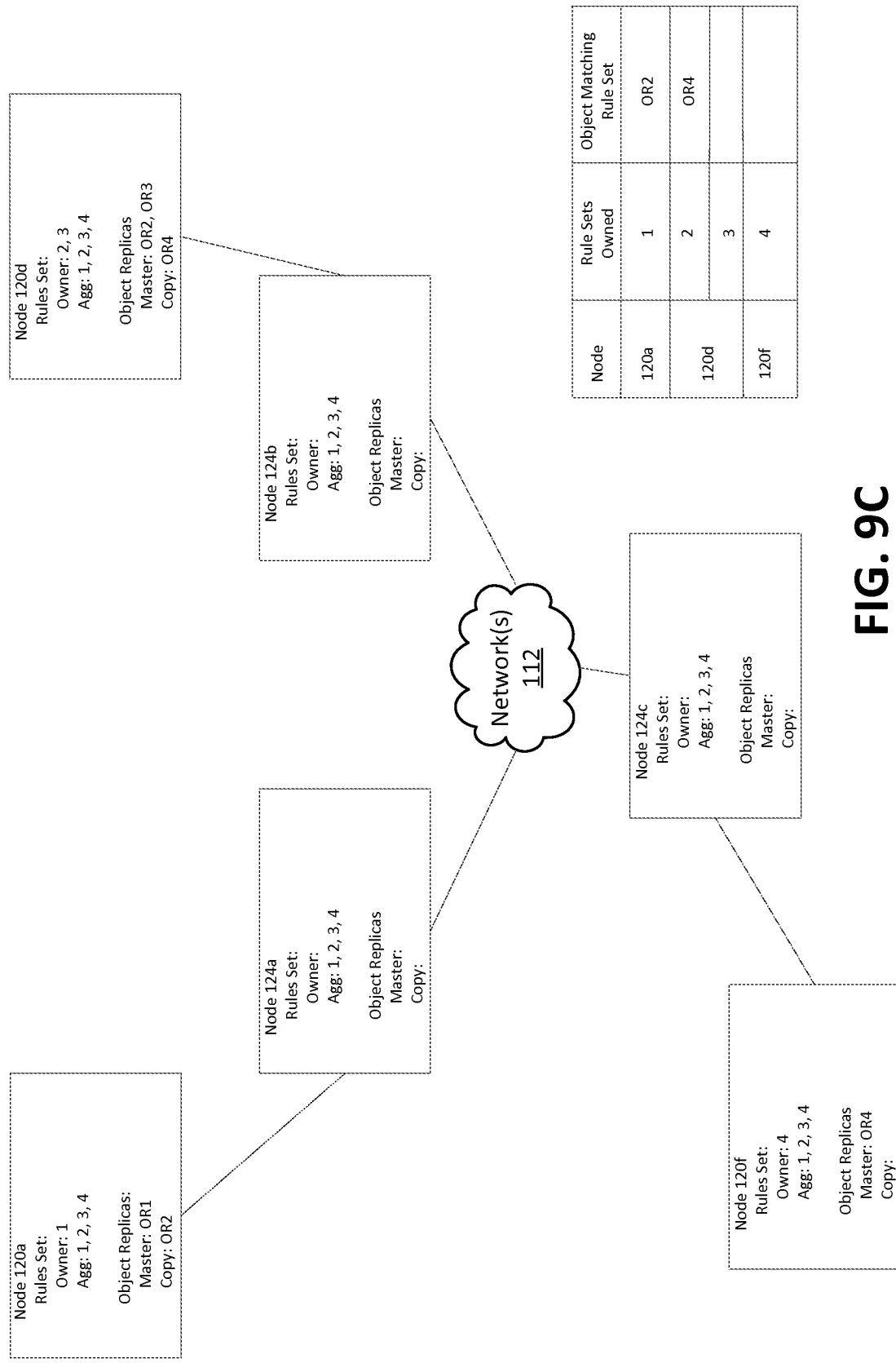

Transmission of the object replicas involves migrating the identified object replicas across the network of nodes to the designated target computing node. It will be appreciated that once an object is identified for replication to a particular node, the object is replicated across the network nodes to the relevant node. That same object need not be reevaluated by other nodes for matching against rule sets as it migrates across the network of nodes. FIG. 9C depicts an illustration of the example system of FIG. 9B as updated to reflect migration of object replicas to the appropriate node. In the example scenario depicted in FIG. 9C, a copy of data object OR2, which matched rule set 1, has been replicated from computing node 120d to computing node 120a which owns rule set 1. Similarly, a copy of data object OR4, which matched rule set 2, has been replication from computing node 120f to computing node 120d, which owns rule set 2.

It will be appreciated that the process of receiving rules, evaluating rules against data objects, and forwarding data objects occurs continuously and dynamically. As computing nodes are added to network 110, subscription rules corresponding to the added nodes are distributed to other nodes in the network. When an existing node receives subscription rules corresponding to an added node, the existing node performs the processing as noted above to evaluate the subscription rules against the attributes of data objects stored on the particular node. Where the subscription rules match the attributes of a data object, the particular data object is marked for forwarding to the new computing node that corresponds to the new subscription rules.

Accordingly, per the example processing illustrated in connection with FIGS. 8, 9A, 9B, and 9C, data objects may be dynamically distributed to those computing nodes that have a need to receive the data object. In the context of a simulation server, only data objects useful for a particular simulation server's portion of the simulation are sent to each simulation server. Hubs only receive object updates that are of interest to at least one of the user systems that are connected to the particular hub. Computing nodes receive the particular data objects that the nodes require to provide the desired services, but additional network and processing resources are not wasted on communicating data objects that are not needed.

It will be appreciated that variations of the above-described processing may be applied to address the desired functionality. For example, while the above described processing is used to replicate copies of data objects, the same or similar use of rules may be employed to transfer the ownership of a data object. For example, the rules may specify data objects that should be owned by particular computing nodes. Accordingly, when a data object is communicated pursuant to a rule, the ownership or control of the data object may also be transferred between nodes.

Example Processing Architecture

Figure 10:
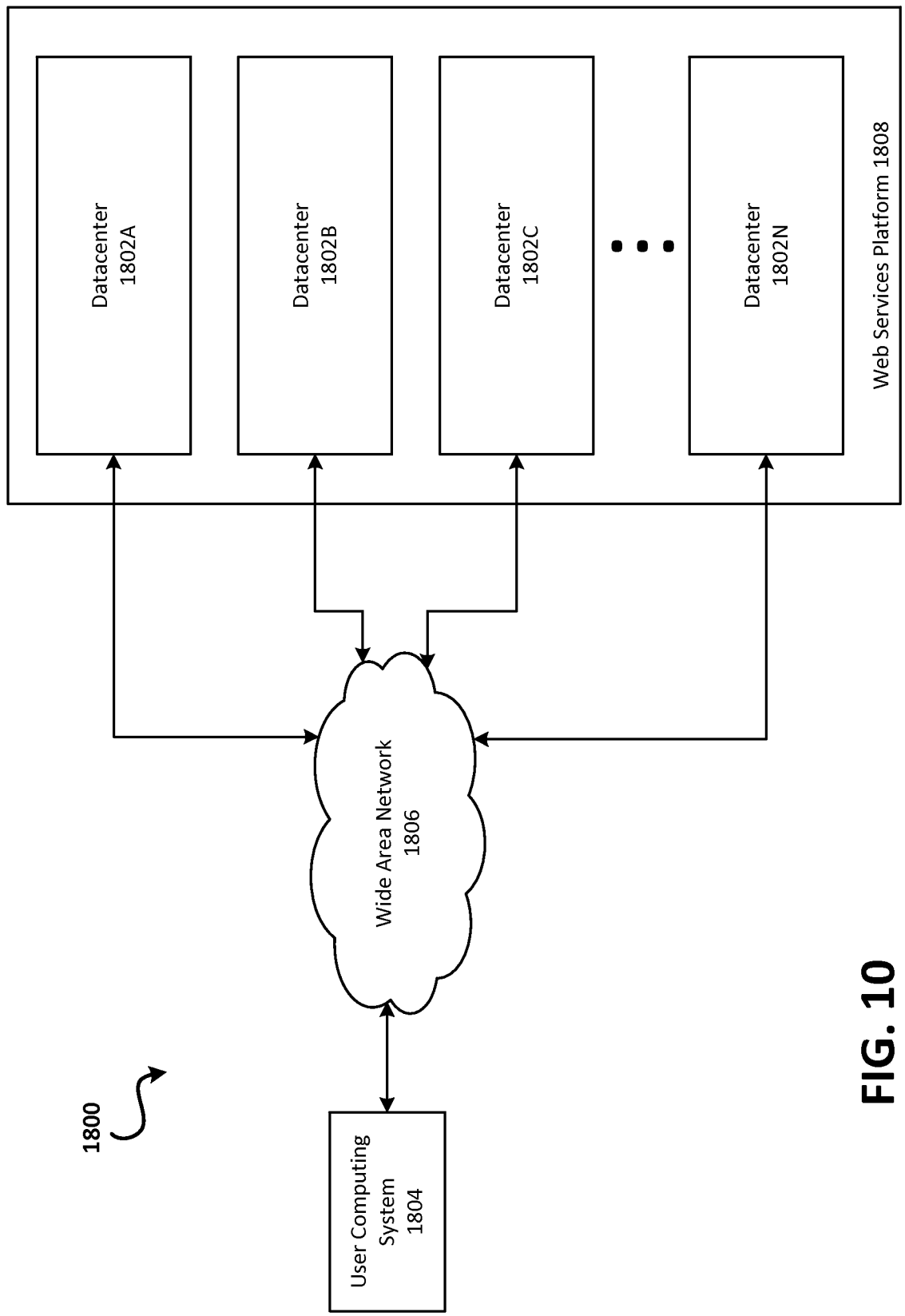
FIG. 10 depicts an example computing arrangement for implementing services accessible.
Figure 11:
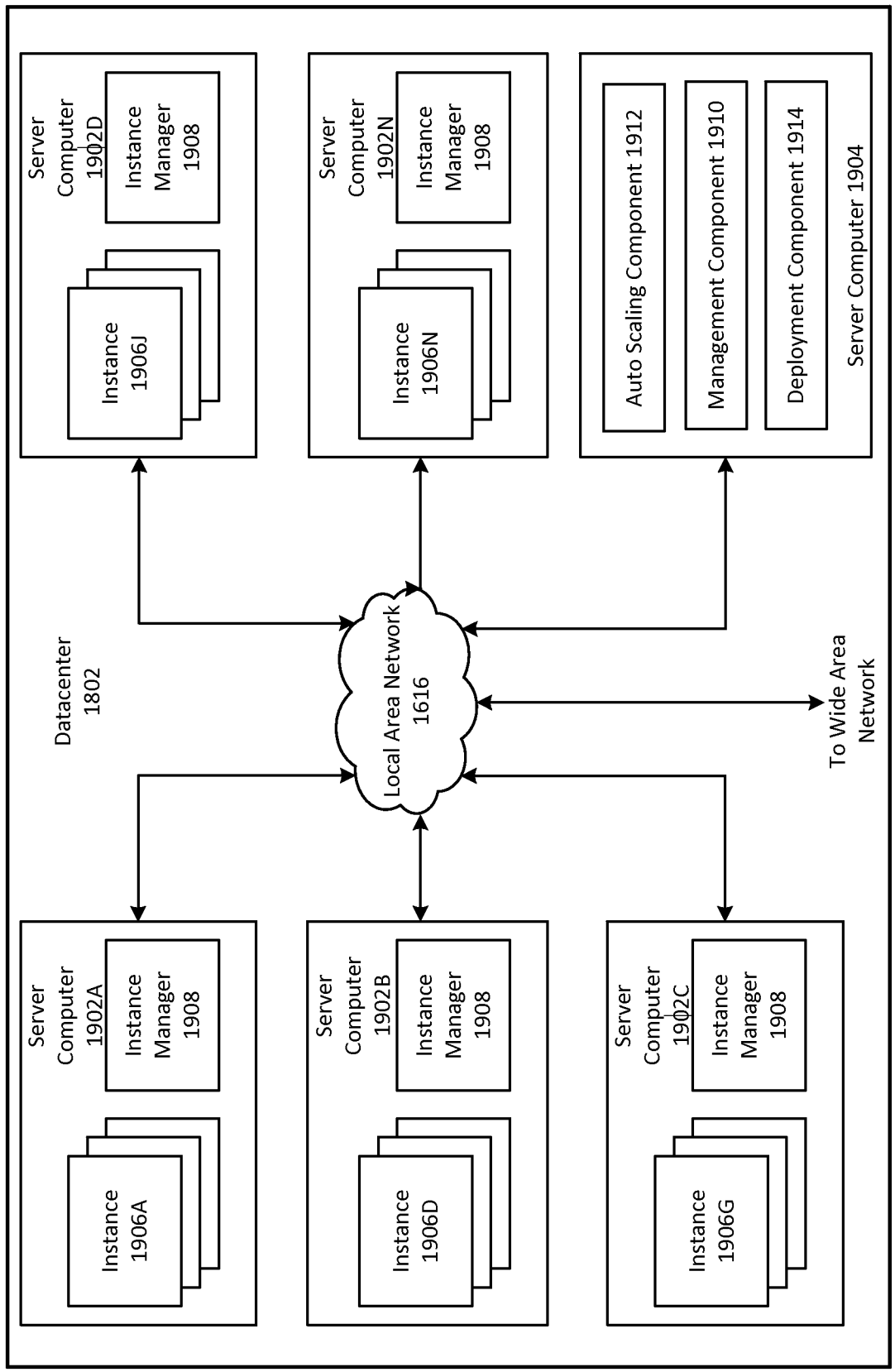
FIG. 11 depicts an example computing arrangement for implementing services accessible.

It will be appreciated that computing system nodes 120 and communication hubs 124 may be comprised in a system architecture adapted to providing web services or cloud based services. User devices 130 may access the architecture via network 112 which may comprise the Internet and/or World Wide Web. FIGS. 10 and 11 depict example operating environments that might be used to implement an on-line service implemented using comprising system nodes 120. Generally, FIG. 10 depicts a web services platform that comprises a plurality of datacenters. FIG. 11 depicts a datacenter that comprises a plurality of computers.

Turning to the details of FIG. 10, this figure depicts an example of a suitable computing environment in which embodiments described herein may be implemented. A cloud service provider (such as web services platform 1808) may configure the illustrated computing environment to host virtual clouds of entities and to enable communication paths between these virtual clouds that may otherwise be isolated. In particular, FIG. 10 is a system and network diagram that shows an illustrative operating environment 1800 that includes a web services platform 1808 for implementing virtual clouds and for providing on-demand access to computer resources, such as virtual machine instances. Web services platform 1808 can provide computer resources for executing applications on a permanent or an as-needed basis and may be configured as a private network. These computer resources may include various types of resources, such as data processing resources, data storage resources, data communication resources, and the like. Each type of computer resource may be general-purpose or may be available in a number of specific configurations. For example, data processing resources may be available as virtual machine instances. The instances may be configured to execute applications, including web servers, application servers, media servers, database servers, and the like. Data storage resources may include file storage devices, block storage devices, and the like.

Each type or configuration of computer resource may be available in different sizes, such as large resources consisting of many processors, large amounts of memory, and/or large storage capacity, and small resources consisting of fewer processors, smaller amounts of memory, and/or smaller storage capacity. Entities may choose to allocate a number of small processing resources as web servers and/or one large processing resource as a database server, for example.

The computer resources provided by web services platform 1808 may be enabled by one or more datacenters 1802A-1802N, which may be referred herein singularly as "datacenter 1802" or in the plural as "datacenters 1802." Datacenters 1802 may be facilities that house and operate computer systems and associated components and may include redundant and backup power, communications, cooling, and security systems. Datacenters 1802 may be located in a same geographical area, such as in a same facility, and may be interconnected using private networks, such as high-speed fiber optic networks, controlled and managed by a service provider of web services platform 1808. Datacenters 1802 may also be distributed across geographically disparate locations and may be interconnected in part using public networks, such as the Internet. One illustrative configuration for datacenter 1802 that implements the concepts and technologies disclosed herein is described below with regard to FIG. 11.

Entities of web services platform 1808 may access the computer resources provided by datacenters 1802 over a Wide Area Network (WAN) 1806. Although a WAN is illustrated in FIG. 10, it should be appreciated that a Local Area Network (LAN), the Internet, or any other networking topology known in the art that connects datacenters 1802 to remote entities and other users may be utilized. It should also be appreciated that combinations of such networks may also be utilized.

An entity or other entities that are users of web services platform 1808 may utilize a computing system 1804 to access the computer resources provided by datacenters

1802. User computing system 1804 comprises a computer capable of accessing web services platform 1808, such as a server computer, a desktop or laptop personal computer, a tablet computer, a wireless telephone, a PDA, an e-reader, a game console, a set-top box, an automobile, an automobile system, a home appliance, a manufacturing device or sensor, a building control system, a farming instrument, or any other computing node or thing that is able to communicate with data center 1802. In an example scenario, computing system 1804 may correspond, for example, devices 130 described above.

In an example scenario, a particular user computing system 1804 may be utilized to configure aspects of the computer resources provided by web services platform 1808. In this regard, web services platform 1808 may provide a web interface through which aspects of its operation may be configured through the use of a web browser application program executing on user computing system 1804. Alternatively, a stand-alone application program executing on user computing system 1804 may access an application programming interface (API) exposed by web services platform 1808 for performing the configuration operations. Other mechanisms for configuring the operation of web services platform 1808, including launching new virtual machine instances on web services platform 1808, may also be utilized.

According to embodiments disclosed herein, capacities of purchased computer resources provided by web services platform 1808 can be scaled in response to demand. In this regard, scaling refers to the process of instantiating, which may also be referred to herein as "launching" or "creating," or terminating, which may also be referred to herein as "de-scaling," instances of computer resources in response to demand.

Web services platform 1808 may also be configured with a deployment component to assist entities in the deployment of new instances of computer resources. The deployment component may receive a configuration from an entity that may include data describing how new instances should be configured. For example, the configuration may specify one or more applications or software components that should be installed in new instances, provide scripts and/or other types of code to be executed in new instances, provide cache warming logic specifying how an application cache should be prepared, and other types of information. The deployment component utilizes the entity-provided configuration and cache warming logic to launch, configure, and prime new instances of computer resources.

FIG. 11 depicts a computing system diagram that illustrates one configuration for datacenter 1802 that implements web services platform 1808. The example datacenter 1802 shown in FIG. 11 may include several server computers 1902A-1902N, which may be referred herein singularly as "server computer 1902" or in the plural as "server computers 1902," for providing computer resources for hosting virtual clouds and for executing applications. Server computers 1902 may be standard tower or rack-mount server computers configured appropriately for providing the computer resources described above. For instance, in one implementation server computers 1902 may be configured to provide instances 1906A-1906N of computer resources.

Instances 1906A-1906N, which may be referred herein singularly as "instance 1906" or in the plural as "instances 1906," may be virtual machine instances. As known in the art, a virtual machine instance is an instance of a software implementation of a machine (i.e., a computer) that executes programs like a physical machine. In the example of virtual machine instances, each server 1902 may be configured to execute an instance manager 1908 capable of executing the instances. Instance manager 1908 may be a hypervisor or another type of program configured to enable the execution of multiple instances 1906 on a single server 1902, for example. As discussed above, each of instances 1906 may be configured to execute all or a portion of an application.

It should be appreciated that although the embodiments disclosed herein are described primarily in the context of virtual machine instances, other types of instances can be utilized with the concepts and technologies disclosed herein. For instance, the technologies disclosed herein may be utilized with instances of storage resources, instances of data communications resources, and with other types of resources. The embodiments disclosed herein may also execute all or a portion of an application directly on a computer system without utilizing virtual machine instances.

Datacenter 1802 shown in FIG. 11 may also include a server computer 1904 reserved for executing software components for managing the operation of datacenter 1802, server computers 1902, and instances 1906. In particular, server computer 1904 may execute a management component 1910. As discussed above, working between FIGS. 10 and 11, an entity of web services platform 1808 may utilize user computing system 1804 to access management component 1910 to configure various aspects of the operation of web services platform 1808 and instances 1906 purchased by the entity. For example, the entity may purchase instances and make changes to the configuration of the instances. The entity may also specify settings regarding how the purchased instances are to be scaled in response to demand. The entity may also provide requests to launch instances to management component 1610.

As also described briefly above, an auto scaling component 1912 may scale instances 1906 based upon rules defined by an entity of web services platform 1908. For example, auto scaling component 1912 may allow an entity to specify scale up rules for use in determining when new instances should be instantiated and scale down rules for use in determining when existing instances should be terminated.

As discussed briefly above, datacenter 1802 may also be configured with a deployment component 1914 to assist entities in the deployment of new instances 1906 of computer resources. Deployment component 1914 may receive a configuration from an entity that includes data describing how new instances 1906 should be configured. For example, the configuration may specify one or more applications that should be installed in new instances 1906, provide scripts and/or other types of code to be executed for configuring new instances 1906, provide cache warming logic specifying how an application cache should be prepared, and other types of information.

Deployment component 1914 may utilize the entity-provided configuration and cache warming logic to configure, prime, and launch new instances 1906. The configuration, cache warming logic, and other information may be specified by an entity using management component 1910 or by providing this information directly to deployment component 1914. Other mechanisms may also be utilized to configure the operation of deployment component 1914.

In the example datacenter 1802 shown in FIG. 11, an appropriate LAN 1916 may be utilized to interconnect server computers 1902A-1902N and server computer 1904. LAN 1916 may also be connected to WAN 1806 illustrated in FIG. 10. It should be appreciated that the network topology illustrated in FIGS. 10 and 11 has been greatly simplified and that many more networks and networking devices may be utilized to interconnect the various computing systems disclosed herein. Appropriate load balancing devices or software modules may also be utilized for balancing a load between each of datacenters 1802A-1802N, between each of server computers 1902A-1902N in each datacenter 1802 and between instances 1906 purchased by each entity of web services platform 1808. These network topologies and devices should be apparent to those skilled in the art.

It should be appreciated that datacenter 1802 described in FIG. 11 is merely illustrative and that other implementations may be utilized. In particular, functionality described herein as being performed by management component 1910, auto scaling component 1912, and deployment component 1914 may be performed by one another, may be performed by other components, or may be performed by a combination of these or other components. Additionally, it should be appreciated that this functionality may be implemented in software, hardware, or a combination of software and hardware. Other implementations should be apparent to those skilled in the art.

Figure 12:
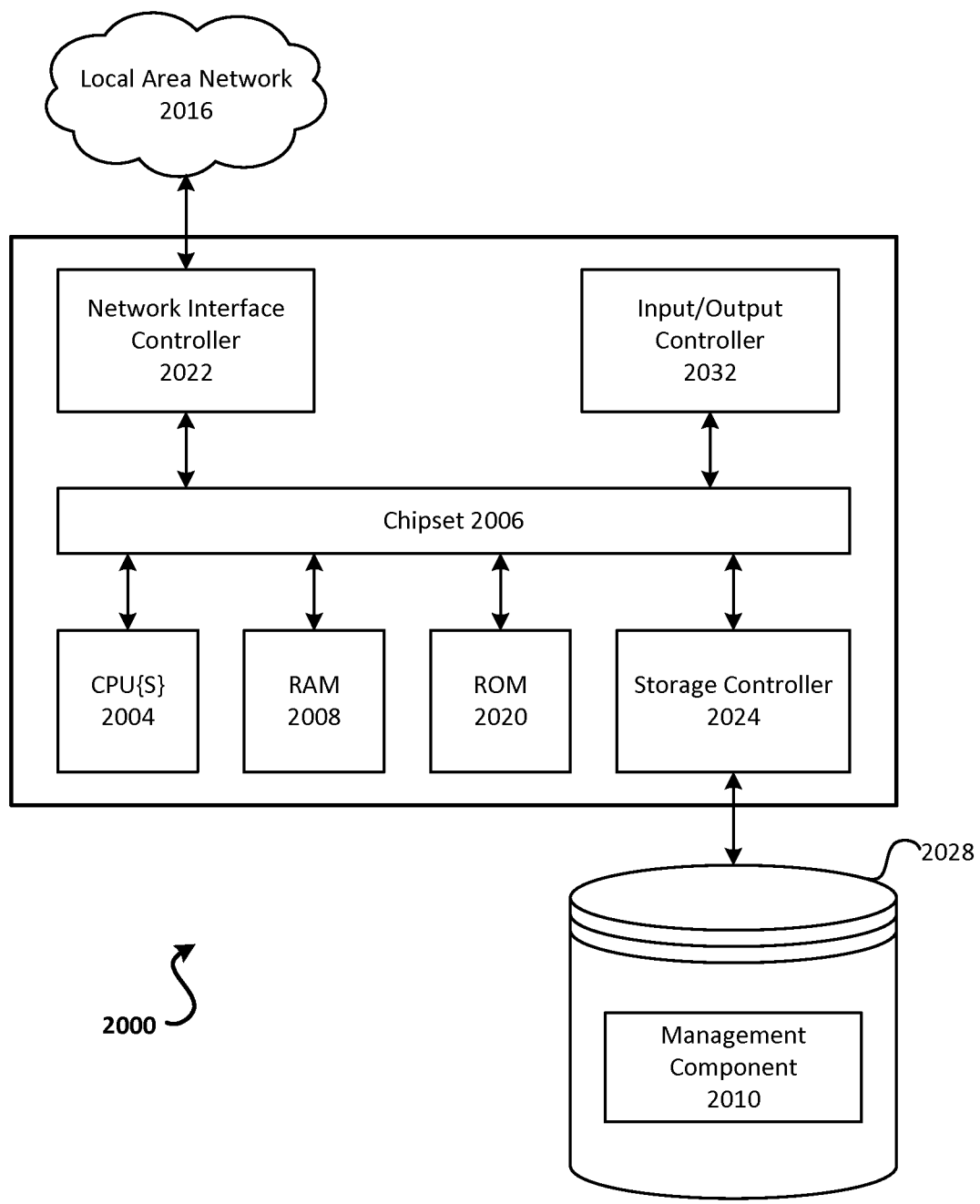
FIG. 12 depicts an example computing system.

FIG. 12 depicts an example computer architecture for a computing system 2000 capable of executing software for performing operations as described above in connection with FIGS. 1-11. The computer architecture shown in FIG. 12 illustrates a conventional server computer, workstation, desktop computer, laptop, tablet, network appliance, PDA, e-reader, digital cellular phone, or other computing node, and may be utilized to execute any aspects of the software components presented herein described as executing on servers 140, 142, 144, 146, 150, 220, 230, and 240, on devices 130, within datacenters 1802A-1802N, on server computers 1902A-1902N, or on any other computing system mentioned herein.

Computer 2000 may include a baseboard, or "motherboard," which is a printed circuit board to which a multitude of components or devices may be connected by way of a system bus or other electrical communication paths. One or more central processing units (CPUs) 2004 may operate in conjunction with a chipset 2006. CPUs 2004 may be standard programmable processors that perform arithmetic and logical operations necessary for the operation of computer 2000.

CPUs 2004 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

Chipset 2006 may provide an interface between CPUs 2004 and the remainder of the components and devices on the baseboard. Chipset 2006 may provide an interface to a random access memory (RAM) 2008 used as the main memory in computer 2000. Chipset 2006 may further provide an interface to a computer-readable storage medium, such as a read-only memory (ROM) 2020 or non-volatile RAM (NVRAM) (not shown), for storing basic routines that may help to start up computer 2000 and to transfer information between the various components and devices. ROM 2020 or NVRAM may also store other software components necessary for the operation of computer 2000 in accordance with the embodiments described herein.

Computer 2000 may operate in a networked environment using logical connections to remote computing nodes and computer systems through LAN 2016. Chipset 2006 may include functionality for providing network connectivity through a network interface controller (NIC) 2022, such as a gigabit Ethernet adapter. NIC 2022 may be capable of connecting the computer 2000 to other computing nodes over LAN 2016. It should be appreciated that multiple NICs 2022 may be present in computer 2000, connecting the computer to other types of networks and remote computer systems.

Computer 2000 may be connected to a mass storage device 2028 that provides non-volatile storage for the computer. Mass storage device 2028 may store system programs, application programs, other program modules, and data, which have been described in greater detail herein. Mass storage device 2028 may be connected to computer 2000 through a storage controller 2024 connected to chipset 2006. Mass storage device 2028 may consist of one or more physical storage units. Storage controller 2024 may interface with the physical storage units through a serial attached SCSI (SAS) interface, a serial advanced technology attachment (SATA) interface, a fiber channel (FC) interface, or other type of interface for physically connecting and transferring data between computers and physical storage units.

Computer 2000 may store data on mass storage device 2028 by transforming the physical state of the physical storage units to reflect the information being stored. The specific transformation of a physical state may depend on various factors and on different implementations of this description. Examples of such factors may include, but are not limited to, the technology used to implement the physical storage units and whether mass storage device 2028 is characterized as primary or secondary storage and the like.

For example, computer 2000 may store information to mass storage device 2028 by issuing instructions through storage controller 2024 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. Computer 2000 may further read information from mass storage device 2028 by detecting the physical states or characteristics of one or more particular locations within the physical storage units.

In addition to mass storage device 2028 described above, computer 2000 may have access to other computer-readable storage media to store and retrieve information, such as program modules, data structures, or other data. It should be appreciated by those skilled in the art that computer-readable storage media can be any available media that provides for the storage of non-transitory data and that may be accessed by computer 2000.

By way of example and not limitation, computer-readable storage media may include volatile and non-volatile, transitory computer-readable storage media and non-transitory computer-readable storage media, removable and non-removable media implemented in any method or technology. Computer-readable storage media includes, but is not limited to, RAM, ROM, erasable programmable ROM (EPROM), electrically erasable programmable ROM (EE- PROM), flash memory or other solid-state memory technology, compact disc ROM (CD-ROM), digital versatile disk (DVD), high definition DVD (HD-DVD), BLU-RAY, or other optical storage, magnetic cassettes, magnetic tape, magnetic disk storage, other magnetic storage devices, or any other medium that can be used to store the desired information in a non-transitory fashion.

Mass storage device 2028 may store an operating system utilized to control the operation of the computer 2000. According to one embodiment, the operating system comprises a version of the LINUX operating system. According to another embodiment, the operating system comprises a version of the WINDOWS SERVER operating system from the MICROSOFT Corporation. According to further embodiments, the operating system may comprise a version of the UNIX operating system. It should be appreciated that other operating systems may also be utilized. Mass storage device 2028 may store other system or application programs and data utilized by computer 2000, such as management component 2010 and/or the other software components described above.

Mass storage device 2028 or other computer-readable storage media may also be encoded with computer-executable instructions, which, when loaded into computer 2000, transforms the computer from a general-purpose computing system into a special-purpose computer capable of implementing the embodiments described herein. These computer-executable instructions transform computer 2000 by specifying how CPUs 2004 transition between states, as described above. Computer 2000 may have access to computer-readable storage media storing computer-executable instructions, which, when executed by computer 2000, may perform operating procedures described above in connection with FIGS. 1-9.

Computer 2000 may also include an input/output controller 2032 for receiving and processing input from a number of input devices, such as a keyboard, a mouse, a touchpad, a touch screen, an electronic stylus, or other type of input device. Similarly, input/output controller 2032 may provide output to a display, such as a computer monitor, a flat-panel display, a digital projector, a printer, a plotter, or other type of output device. It will be appreciated that computer 2000 may not include all of the components shown in FIG. 20, may include other components that are not explicitly shown in FIG. 20, or may utilize an architecture completely different than that shown in FIG. 12.

As described herein, a computing node may be a physical computing node, such as computer 2000 of FIG. 12. A computing node may also be a virtual computing node, such as a virtual machine instance, or a session hosted by a physical computing node, where the computing node is configured to host one or more sessions concurrently.

Accordingly applicants have disclosed a computing framework that is dynamically scalable so as to support on-line applications that are computationally intensive and operate on large amounts of distributed data items. It will be appreciated that while specific embodiments and examples have been disclosed herein, the scope of potential embodiments is not limited to those specifically referenced. For example, while example embodiments have been described with reference to providing on-line gaming services and simulating object in a game world, the intended embodiments include other content items such as on-line services for other types of functionality.

It should be appreciated that the subject matter presented herein may be implemented as a computer process, a computer-controlled apparatus, or a computing system or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will also appreciate that the subject matter described herein may be practiced on or in conjunction with other computer system configurations beyond those described herein, including multiprocessor systems, microprocessor-based or programmable consumer electronics, minicomputers, mainframe computers, handheld computers, personal digital assistants, e-readers, cellular telephone devices, special purposed hardware devices, network appliances, and the like. The embodiments described herein may also be practiced in distributed computing environments, where tasks are performed by remote processing devices that are linked through a communications network. In a distributed computing environment, program modules may be located in both local and remote memory storage devices.

Networks established by or on behalf of an entity, such as a company or organization, to provide one or more services (such as various types of cloud-based computing or storage) accessible via the Internet and/or other networks to a distributed set of clients may be termed provider networks. Such a provider network may include one or more data centers hosting various resource pools, such as collections of physical and/or virtualized computer servers, storage devices, networking equipment, and the like, that may be used to implement and distribute the infrastructure and services offered by the provider network. The resources may in some embodiments be offered to clients in units called "instances," such as virtual or physical compute instances or storage instances. A virtual computing instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor).

A number of different types of computing devices may be used singly or in combination to implement the resources of the provider network in different embodiments, including general purpose or special purpose computer servers, storage devices, network devices, and the like. In some embodiments a client or user may be provided direct access to a resource instance, e.g., by giving a user an administrator login and password. In other embodiments, the provider network operator may allow clients to specify execution requirements for specified client applications and schedule execution of the applications on behalf of the client on execution platforms (such as application server instances, Java™ virtual machines (JVMs), general purpose or special purpose operating systems, platforms that support various interpreted or compiled programming languages, such as Ruby, Perl, Python, C, C++, and the like or high-performance computing platforms) suitable for the applications. This may be done without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage, and/or other network-accessible functionality may allow customers to reserve or purchase access to resources in various resource acquisition modes. The computing resource provider may provide facilities for customers to select and launch the desired computing resources, deploy application components to the computing resources, and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server, or some combination of the two. Various types and configurations of instances may be made available, including different sizes of resources executing different operating systems (OS) and/or hypervisors and with various installed software applications, runtimes, and the like. Instances may further be available in specific availability zones, representing a data center or other geographic location of the underlying computing hardware, for example.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations, inexpensive and low latency network connectivity may be provided between resource instances that reside within the same geographical region (and network transmissions between resources of the same availability zone may be even faster).

The provider network may make instances available "on-demand," allowing a customer to select a number of instances of a specific type and configuration (e.g. size, platform, tenancy, availability zone, and the like) and quickly launch the instances for deployment. On-demand instances may further be added or removed as needed, either manually or automatically through auto scaling, as demand for or capacity requirements changes over time. The customer may incur ongoing usage costs related to their on-demand instances, based on the number of hours of operation and/or the actual resources utilized, for example.

The computing resource provider may also make reserved instances available to the customer. Reserved instances may provide the customer with the ability to reserve a number of a specific type and configuration of instances for a fixed term, such as one year or three years, for a low, upfront cost in exchange for reduced hourly or other usage costs, for example, if and when the instances are launched. This may allow the customer to defer costs related to scaling up the deployed application in response to increase in demand, while ensuring that the right resources will be available when needed. While reserved instances provide customers with reliable, stand-by capacity for scaling of their application, purchasing reserved instances may also lock the customer into a specific number, type, and/or configuration of computing resource in a specific availability zone for a longer period than desired. If the technical architecture or needs of the application change, the customer may not be able to realize a return on the customer's investment in the reserved instances.

Operators of such provider networks may in some instances implement a flexible set of resource reservation, control, and access interfaces for their clients. For example, a resource manager of the provider network may implement a programmatic resource reservation interface (e.g., via a web site or a set of web pages) that allows clients to learn about, select, purchase access to and/or reserve resource instances. In some embodiments discussed below where an entity, such as a resource manager or a pricing optimizer, is described as implementing one or more programmatic interfaces, such as a web page or an API, an interface manager subcomponent of that entity may be responsible for the interface-related functionality. In many embodiments equivalent interface-related functionality may be implemented by a separate or standalone interface manager, external to the resource manager and the pricing optimizer. Such an interface may include capabilities to allow browsing of a resource catalog and details and specifications of the different types or sizes of resources supported and the different reservation types or modes supported, pricing models, and so on.

The provider network may support several different purchasing modes (which may also be referred to herein as reservation modes) corresponding to some of the instance types described above. For example, the provider network may support long-term reservations, on-demand resource allocations, or spot-price-based resource allocations. Using the long-term reservation mode, a client may make a low, one-time, upfront payment for a resource instance, reserve it for a specified duration, such as a one- or three-year term, and pay a low hourly rate for the instance; the client would be assured of having the reserved instance available for the term of the reservation. Using the on-demand mode, a client could pay for capacity by the hour (or some appropriate time unit), without any long-term commitments or upfront payments. In the spot-price mode, a client could specify the maximum price per unit of time that it is willing to pay for a particular type of resource, and if the client's maximum price exceeded a dynamic spot price determined at least in part by supply and demand, then that type of resource would be provided to the client. In some embodiments, dynamically resizable pools of resource instances may be set aside for the different reservation types or modes—e.g., long-term reserved instances may be allocated from one pool, on-demand instances from another, and so on. During periods when the supply of the requested resource type exceeded the demand, the spot price may become significantly lower than the price for the on-demand mode. In some implementations, if the spot price increases beyond the maximum bid specified by a client, a resource allocation may be interrupted—i.e., a resource instance that was previously allocated to the client may be reclaimed by the resource manager and may be allocated to some other client that is willing to pay a higher price. Other purchasing modes or combinations of modes may be implemented by the resource manager in some embodiments.

It will be appreciated that while illustrative embodiments have been disclosed, the scope of potential embodiments is not limited to those explicitly described. For example, while the concepts are described with reference to requests received to perform particular types of functions or commands, the envisioned embodiments extend to processing involving any and all types of functions and commands. Similarly, while the concepts are described with reference to particular protocols and formats, the envisioned embodiments extend to processing involving any and all types of protocols and formats.

Each of the processes, methods, and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. For example, described blocks or states may be performed in an order other than that specifically disclosed, or multiple blocks or states may be combined in a single block or state. The example blocks or states may be performed in serial, in parallel, or in some other manner Blocks or states may be added to or removed from the disclosed example embodiments. For example, elements may be added to, removed from or rearranged compared to the disclosed example embodiments.

It will also be appreciated that various items are illustrated as being stored in memory or on storage while being used, and that these items or portions of thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc.

Some or all of the modules, systems and data structures may also be stored (e.g., as software instructions or structured data) on a computer-readable medium, such as a hard disk, a memory, a network, or a portable media article to be read by an appropriate drive or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A system, comprising:
   at least two communication hubs, the at least two communication hubs communicatively coupled to other of the at least two of communication hubs and programmed to communicate with one more client devices, wherein communication with the communication hubs from the client devices includes data associated with modifications to data objects in a virtual environment; and
   at least two simulation servers programmed to simulate the data objects in the virtual environment and communicatively coupled with one or more of the communication hubs,
   the at least two simulation servers programmed to move responsibility for processing a plurality of data objects to another simulation server in response to determining processing has reached a threshold by assigning ownership of data objects to a first simulation server, monitoring a processing load of the first simulation server, identifying a subset of the data objects based upon a shared property upon determining the processing load meets a threshold, and reassigning ownership of the subset of data objects to a second simulation server, and the at least two simulation servers programmed to copy one or more data objects stored thereon to other of the simulation servers upon determining subscription rules associated with the other of the simulation servers match the one or more data objects.

2. The system of claim 1, wherein the at least two communication hubs are programmed to reassign a client device to another communication hub upon determining the other communication hub receives from a simulation server data of interest to the client device.

3. The system of claim 1, wherein each simulation server programmed to copy one or more data objects stored thereon to other of the simulation servers is programmed to perform operations comprising:
  receiving at a first simulation server a first set of subscription rules defining characteristics of data objects for distribution to a second simulation server;
  evaluating the first set of subscription rules against data objects stored on the first simulation server;
  identifying, based upon the evaluating the first set of subscription rules against data objects stored on the first simulation server, a first data object for communication to the second simulation server; and
  communicating the identified first data object to the second simulation server.

4. A method, comprising:
  at a first computing node in a network comprising a plurality of computing nodes associated with processing a virtual environment, processing a plurality of data objects associated with the virtual environment;
  at the first computing node, determining that processing has reached a threshold based at least in part due to modifications to the virtual environment or data objects;
  at the first computing node, moving responsibility for processing a plurality of data objects to a second computing node by monitoring processing of the first computing node, the first computing node having control of a first group of data objects and, in response to the processing reaching a threshold value, reassigning control of a subset of the first group of data objects to the second computing node based on one or more properties of the subset of the first group of data objects; and
  at the second computing node, determining that subscription rules associated with a third computing node match a data object stored on the second computing node, wherein the plurality of computing nodes have subscription rules;
  at the second computing node, copying the data object to the third computing node.

5. The method of claim 4, wherein determining that subscription rules associated with a third computing node match a data object stored in the second computing node comprises
  evaluating characteristics defined by the subscription rules associated with the third computing node against data objects stored on the second computing node;
  identifying a data object stored on the second computing node as meeting the characteristics defined by the rules associated with the third computing node.

6. The method of claim 4, wherein the network has a client device communicating therewith,
  further comprising determining to reassign the client device to another network component based upon determining the another network component receives data of interest to the client device from one of the plurality of computing nodes.

7. The method of claim 4, wherein monitoring the processing of a first computing node comprises monitoring processing load and determining whether the processing load exceeds a maximum threshold.

8. The method of claim 4, further comprising performing a clustering analysis of the first group of data objects to identify the subset of the first group of data objects.

9. The method of claim 8, wherein the clustering analysis comprises identifying the one or more properties of the subset of the first group of data objects.

10. The method of claim 5, further comprising:
  deriving attributes for data objects stored on the second computing node,
  wherein identifying a data object stored on the second computing node as meeting the characteristics defined by the rules associated with the third computing node comprises evaluating the characteristics against the derived attributes.

11. The method of claim 5, further comprising:
  receiving at the second computing system the rules associated with the third computing node; and
  receiving at the second computing system rules defining characteristics associated with a fourth computing node.

12. The method of claim 11, further comprising:
  aggregating at the second computing node the first set of rules associated with the third computing node and the second set of rules defining characteristics associated with the fourth computing node to form aggregated characteristics,
  wherein identifying a data object stored on the second computing node as meeting the characteristics defined by the rules associated with the third computing node comprises evaluating the aggregated characteristics against data objects stored on the second computing node.

13. One or more non-transitory computer-readable storage media having stored thereon instructions that, upon execution on at least one computing node, cause the at least one computing node to perform operations comprising:
  in a network comprising a plurality of computing nodes performing processing for providing a virtual environment, processing a plurality of data objects associated with the virtual environment;
  at a first computing node in the plurality of computing nodes, determining that processing has reached a threshold due to, at least in part, modifications to the plurality of data objects;
  at the first computing node, reallocating data objects for processing between sets of computing nodes depending upon the processing conditions of the sets of computing nodes by monitoring processing of the first computing node, the first computing node having control of a first group of data objects and, in response to the processing reaching a threshold value, reassigning control of a subset of the first group of data objects to the second computing node based on one or more properties of the subset of the first group of data objects; and
  at the first computing node comparing subscription rules associated with other computing nodes in the plurality of computing nodes to attributes of data objects processed on the first computing node;
  copying data objects from the first computing node to a second computing node based at least, in part, upon determining subscription rules associated with the second computing node match attributes associated the second computing node.

14. The one or more non-transitory computer-readable storage media of claim 13, further comprising:
in the network comprising the plurality of computing nodes, maintaining for each of a plurality of data objects a master copy on the first computing node and a replica copy of the data object on the second computing node.

15. The one or more non-transitory computer-readable storage media of claim 13, wherein copying data objects comprises replicating data objects between computing nodes.

16. The one or more non-transitory computer-readable storage media of claim 13, wherein reallocating data objects for processing between sets of computing nodes depending upon the processing conditions of the sets of computing nodes, comprises:
determining presence of a condition for reallocating data objects that have been allocated for processing by one or more computing nodes;
determining spatial properties of at least one group of data objects that are allocated; and
based on the spatial properties, reallocating the group of data objects among the computing nodes.

17. The one or more non-transitory computer-readable storage media of claim 16, wherein determining presence of a condition for reallocating data objects that have been allocated for processing by one or more computing nodes comprises determining a processing load of at least one of the computing nodes exceeds a threshold.

18. The one or more non-transitory computer-readable storage media of claim 13, wherein comparing subscription rules associated with other computing nodes in the plurality of computing nodes to attributes of data objects processed on the first computing node, comprises:
evaluating characteristics defined in subscription rules against attributes of data objects stored on the first computing node; and
identifying data objects having attributes that match characteristics defined in subscription rules that are associated with computing nodes.

* * * * *